United States Patent
Wild et al.

(10) Patent No.: US 9,923,685 B2
(45) Date of Patent: Mar. 20, 2018

(54) METHOD AND TRANSMITTER APPARATUS FOR GENERATING AND TRANSMITTING CHANNEL FEEDBACK AND METHOD AND RECEIVER APPARATUS FOR RECEIVING AND RETRIEVING CHANNEL FEEDBACK

(71) Applicant: Alcatel Lucent, Boulogne Billancourt (FR)

(72) Inventors: Thorsten Wild, Stuttgart (DE); Cornelis Hoek, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 173 days.

(21) Appl. No.: 14/890,788

(22) PCT Filed: Mar. 25, 2014

(86) PCT No.: PCT/EP2014/055900
§ 371 (c)(1),
(2) Date: Nov. 12, 2015

(87) PCT Pub. No.: WO2014/183911
PCT Pub. Date: Nov. 20, 2014

(65) Prior Publication Data
US 2016/0087769 A1    Mar. 24, 2016

(30) Foreign Application Priority Data

May 15, 2013 (EP) .................................... 13305612

(51) Int. Cl.
*H04W 24/10* (2009.01)
*H04L 5/00* (2006.01)
(Continued)

(52) U.S. Cl.
CPC .......... *H04L 5/0035* (2013.01); *H04B 7/065* (2013.01); *H04B 7/0632* (2013.01);
(Continued)

(58) Field of Classification Search
CPC ............... H04W 72/00; H04W 72/004; H04W 72/0493; H04W 72/087
See application file for complete search history.

(56) References Cited

U.S. PATENT DOCUMENTS

| 9,014,118 B2 * | 4/2015 | Proctor, Jr. ............. H04L 1/165 370/252 |
| 2007/0201388 A1 * | 8/2007 | Shah ..................... H04L 5/0046 370/300 |

(Continued)

FOREIGN PATENT DOCUMENTS

| CN | 102461313 A | 5/2012 |
| CN | 102957470 A | 3/2013 |

(Continued)

OTHER PUBLICATIONS

Donghyun Kim et al., "Efficient Limited Feedback Schemes for Network MIMO Systems," Global Telecommunications Conference (Globecom 2011), IEEE, pp. 1-6, XP032119502, Dec. 5, 2011.

(Continued)

*Primary Examiner* — Andrew Chriss
*Assistant Examiner* — Kenan Cehic
(74) *Attorney, Agent, or Firm* — Fay Sharpe, LLP

(57) ABSTRACT

The embodiments of the invention relate to a method and a transmitter apparatus for generating and transmitting channel feedback. The method contains the steps of determining at least one first quality value averaged over a long term time interval for a first transmission channel (TC1) from a first antenna system (AS1) of a radio communication system (RCS) to an antenna system (AS) of a network node (MS) containing the transmitter apparatus and at least one second quality value averaged over the long term time interval for at least one second transmission channel (TC2, TC3) from at (Continued)

least one second antenna system (AS2, AS3) of the radio communication system (RCS) to the antenna system (AS) of the network node (MS), determining a distribution of radio resource units of a predefined feedback radio resource based on the at least first quality value and the at least second quality value, transmitting to a receiver apparatus (BS1) a long term feedback containing the at least one first quality value and the at least one second quality value, and transmitting with a short term time interval smaller than or equal to the long term time interval to the receiver apparatus (BS1) a short term feedback containing first short term information for the first transmission channel (TC1) and at least second short term information for the at least second transmission channel (TC2, TC3) using the distribution of radio resource units. The embodiments of the invention further relate to a method and a receiver apparatus for receiving and retrieving channel feedback at a receiver apparatus. The method contains the steps of receiving from a transmitter apparatus a long term feedback containing the at least one first quality value and the at least one second quality value, receiving from the transmitter apparatus with the short term time interval the short term feedback using the distribution of radio resource units, and determining the first short term information and the at least second short term information from the short term feedback based on the distribution of radio resource units.

13 Claims, 11 Drawing Sheets

(51) Int. Cl.
  *H04B 7/06* (2006.01)
  *H04L 1/00* (2006.01)
  *H04L 5/14* (2006.01)
(52) U.S. Cl.
  CPC .......... *H04L 1/0026* (2013.01); *H04L 5/0028* (2013.01); *H04L 5/0057* (2013.01); *H04L 5/14* (2013.01); *H04L 5/0048* (2013.01)

(56) References Cited

U.S. PATENT DOCUMENTS

| | | | | |
|---|---|---|---|---|
| 2009/0170548 A1* | 7/2009 | Soliman | ................ | H04W 52/24 455/522 |
| 2010/0099449 A1* | 4/2010 | Borran | ................ | H04W 52/243 455/501 |
| 2010/0272033 A1 | 10/2010 | Fwu et al. | | |
| 2014/0161083 A1* | 6/2014 | Nobukiyo | ........... | H04W 72/042 370/329 |
| 2014/0211684 A1 | 7/2014 | Liu et al. | | |
| 2015/0140926 A1* | 5/2015 | Fujio | ................. | H04B 7/15528 455/7 |

FOREIGN PATENT DOCUMENTS

| | | |
|---|---|---|
| EP | 2 139 124 A1 | 12/2009 |
| EP | 2 701 333 A1 | 2/2014 |
| WO | WO 2011/099779 A2 | 8/2011 |

OTHER PUBLICATIONS

Thorsten Wild et al., "Multi-antenna OFDM channel feedback compression exploiting sparsity," Proceedings of the 2013 19th European Wireless Conference, pp. 1-6, XP055083327, Apr. 16-18, 2013.

Johannes Koppenborg et al., "Test of Downlink Joint Transmission with Distributed Antennas," 17th International ITG Workshop on Smart Antennas, pp. 1-5, XP008165300, Mar. 13-14, 2013.

"3rd Generation Partnership Project; Technical Specification Group Radio Access Network; Evolved Universal Terrestrial Radio Access (E-UTRA); Physical Channels and Modulation (Release 11)," 3GPP TS 36.211 V11.1.0, pp. 1-106, (Dec. 2012).

Thorsten Wild, "A rake-finger based efficient state information feedback compression scheme for the MIMO OFDM FDD downlink," Vehicular Technology Conference (VTC 2010—Spring), IEEE 71st, pp. 1-5, 2010.

Joel A. Tropp et al., "Signal Recovery From Random Measurements Via Orthogonal Matching Pursuit," IEEE Transactions on Information Theory, vol. 53, No. 12, pp. 4655-4666, 2007.

T. Cover et al., "Elements of Information Theory," Wiley, Second Edition, Section 10.3.3, pp. 312-315, 2006.

Gunther Auer et al., Pilot Aided Channel Estimation for OFDM: a Separated Approach for Smoothing and Interpolation, Proceedings of the 40th IEEE International Conference on Communications (ICC), pp. 2173-2178, 2005.

Carmela Cozzo et al., "Rake Receiver Finger Placement for Realistic Channels," IEEE Communications Society, IEEE Wireless Communications and Networking Conference, vol. 1, pp. 316-321, Mar. 21-25, 2004.

International Search Report for PCT/EP2014/055900 dated May 9, 2014.

* cited by examiner

METHOD AND TRANSMITTER APPARATUS FOR GENERATING AND TRANSMITTING CHANNEL FEEDBACK AND METHOD AND RECEIVER APPARATUS FOR RECEIVING AND RETRIEVING CHANNEL FEEDBACK

FIELD OF THE INVENTION

Embodiments of the invention relate to channel feedback in a radio communication system and, more particularly but not exclusively, to channel feedback for a downlink CoMP transmission (CoMP=Coordinated Multipoint).

BACKGROUND

Modern cellular radio communication systems, like the 3GPP LTE system (3GPP=Third Generation Partnership Project, LTE=Long-Term Evolution), rely on MIMO antenna techniques (MIMO=Multiple Input Multiple Output) in order to achieve high spectral efficiency.

Downlink CoMP also known as network MIMO is an effective transmission scheme for improving an overall performance of the radio communication systems. Thereby, the overall data rate can be increased without requiring additional frequency spectrum or without requiring an increase of transmit power. Especially users that are located at the border between two radio cells or two radio sectors can benefit from downlink CoMP transmissions.

Downlink CoMP is a transmission of downlink data from a so-called multipoint transmitter of a radio access network to one or several so-called single point receivers such as one or several mobile stations. The multipoint transmitter is provided by two or more antenna systems of the radio access network, which are arranged at different locations. The two antenna systems may be for example two base stations or two RRHs (RRH=Remote Radio Head). The single point receiver is connected only to a single antenna system, which may contain one antenna element or multiple antenna elements.

The downlink CoMP transmission scheme and a corresponding interference alignment require accurate channel state information at the multipoint transmitter for being able to determine suitable downlink CoMP transmission parameters in such a way, that inter-cell interference via spatial processing (e.g. precoding) is suppressed and useful signal contributions coherently add-up at the single point receiver.

In case of downlink CoMP transmission in a so-called TDD transmission mode (TDD=Time Division Duplex), a reception of uplink sounding signals at receivers co-located with the multipoint transmitter may be applied and reused for getting knowledge of channel states of the downlink channels from the multipoint transmitter to the single point receiver. But in case of downlink CoMP transmission in a so-called FDD transmission mode (FDD=Frequency Division Duplex), a full channel reciprocity is not available at the multipoint transmitter due to a so-called duplex distance between a downlink frequency range used for the downlink CoMP transmission and an uplink frequency range used for an uplink transmission from the mobile station to a single antenna system or to several antenna systems (also called uplink CoMP transmission) of the radio access network. In such a case channel characteristics or conditions such as noise or fast fading of an uplink channel are quite different to channel characteristics or conditions of a downlink channel and therefore cannot be reused for a determination of suitable transmission parameters for the downlink CoMP transmission. Therefore, channel conditions of the downlink CoMP transmission have to be measured at the mobile station and have to be fed back to the radio access network via uplink signaling.

The uplink signaling is performed individual by each mobile station, which means that each mobile station may report channel conditions for a so-called reporting cluster of radio cells, which may be predefined by a network node such as a master base station for the downlink CoMP transmission. The master base station uses the uplink signaling from multiple mobile stations for calculating optimum downlink CoMP transmission parameters for downlink transmissions to the multiple mobile stations.

SUMMARY

The uplink signalling for downlink CoMP in the FDD transmission mode should provide very accurate channel knowledge across multiple cells by requiring as less feedback radio resources as possible. Thus, objects of the embodiments of the invention are providing an efficient channel state feedback for downlink CoMP and downlink channel knowledge at the multipoint transmitter should be most accurate as possible with respect to a usage of a predefined number of feedback radio resources.

The object is achieved by a method for generating and transmitting channel feedback by a transmitter apparatus. The method contains the step of determining at least one first quality value averaged over a long term time interval for a first transmission channel from a first antenna system of a radio communication system to an antenna system of a network node comprising the transmitter apparatus and at least one second quality value averaged over the long term time interval for at least one second transmission channel from at least one second antenna system of the radio communication system to the antenna system of the network node. The method may further contain the step of determining a distribution of radio resource units of a predefined feedback radio resource based on the at least first quality value and the at least second quality value. The method may further contain the step of transmitting to a receiver apparatus a long term feedback, which contains the at least one first quality value and the at least one second quality value. The method may further contain the step of transmitting with a short term time interval smaller than or equal to the long term time interval to the receiver apparatus a short term feedback, which contains first short term information for the first transmission channel and at least second short term information for the at least second transmission channel using the distribution of radio resource units.

The object is further achieved by a transmitter apparatus for generating and transmitting channel feedback. The transmitter apparatus may contain means for determining at least one first quality value averaged over a long term time interval for a first transmission channel from a first antenna system of a radio communication system to an antenna system of a network node containing the transmitter apparatus and at least one second quality value averaged over the long term time interval for at least one second transmission channel from at least one second antenna system of the radio communication system to the antenna system of the network node. The transmitter apparatus may further contain means for determining a distribution of radio resource units of a predefined feedback radio resource based on the at least first quality value and the at least second quality value. The transmitter apparatus may further contain means for transmitting to a receiver apparatus a long term feedback containing the at least one first quality value and the at least one second quality value and for transmitting with a short term time interval smaller than or equal to the long term time interval to the receiver apparatus a short term feedback containing first short term information for the first transmission channel and at least second short term information for the at least second transmission channel using the distribution of radio resource units.

In embodiments, the means for determining the at least one first quality value and the at least one second quality value may correspond to any first determining unit, first determination unit, first determining module or first determination module. Hence, in embodiments, the means for determining the at least one first quality value and the at least one second quality value may contain an input for reference signals received via the first transmission channel and the second transmission channel, an algorithm, which determines the at least one first quality value and the at least one second quality value and the short term feedback based on the received reference signals and an output for the at least first quality value and the at least second quality value and the short term feedback. In some embodiments the means for determining the at least one first quality value and the at least one second quality value can be implemented in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

In embodiments, the means for determining the distribution of radio resource units may correspond to any second determining unit, second determination unit, second determining module or second determination module or to the first determining unit, the first determination unit, the first determining module or the first determination module. Hence, in embodiments, the means for determining the distribution of radio resource units may contain an input for the at least first quality value of the first transmission channel and the at least second quality value of the at least second transmission channel, an algorithm, which determines the distribution of radio resource units based on the at least first quality value and the at least second quality value and an output for the distribution of radio resource units. In some embodiments the means for determining the distribution of radio resource units can be implemented in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

In embodiments, the means for transmitting may correspond to any transmitting unit such as a transmitter, transceiver, etc. Hence, in embodiments the means for transmitting may contain an input for the long term feedback, the short term feedback and the distribution of radio resource units, a radio signal generation unit with sub-units such as coding unit, modulation unit and amplification unit for generating radio frequency signals containing the long term feedback and/or the short term feedback, and an output for the radio frequency signals containing the long term feedback and/or the short term feedback. In some embodiments the means for transmitting can be implemented partly in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

The object is even further achieved by a method for receiving and retrieving channel feedback at a receiver apparatus. The method contains the steps of receiving from a transmitter apparatus a long term feedback, which contains at least one first quality value being averaged over a long term time interval for a first transmission channel from a first antenna system of a radio communication system to an antenna system of a network node, which contains the transmitter apparatus. The long term feedback further contains at least one second quality value being averaged over the long term time interval for at least one second transmission channel from at least one second antenna system of the radio communication system to the antenna system of the network node. The method further contains the step of receiving from the transmitter apparatus by a short term time interval a short term feedback, which contains first short term information for the first transmission channel and at least second short term information for the at least second transmission channel using a distribution of radio resource units of a predefined feedback radio resource. The distribution of radio resource units may be determined based on the at least first quality value and the at least second quality value. The short term time interval may be smaller than or equal to the long term time interval.

The method further contains the step of determining the first short term information and the at least second short term information from the short term feedback based on the distribution of radio resource units.

The object is even further achieved by a receiver apparatus for receiving and retrieving a channel feedback. The receiver apparatus contains means for receiving from a transmitter apparatus a long term feedback, which contains at least one first quality value being averaged over a long term time interval for a first transmission channel from a first antenna system of a radio communication system to an antenna system of a network node, which contains the transmitter apparatus. The long term feedback further contains at least one second quality value being averaged over the long term time interval for at least one second transmission channel from at least one second antenna system of the radio communication system to the antenna system of the network node. The means for receiving are further adapted to receive from the transmitter apparatus with a short term time interval smaller than or equal to the long term time interval a short term feedback, which contains first short term information for the first transmission channel and at least second short term information for the at least second transmission channel using a distribution of radio resource units of a predefined feedback radio resource. The distribution of radio resource units is determined based on the at least first quality value and the at least second quality value. The receiver apparatus further contains means for determining the first short term information and the at least second short term information from the short term feedback based on the distribution of radio resource units.

In embodiments, the means for receiving may correspond to any receiving unit such as a receiver, transceiver, etc. Hence, in embodiments the means for receiving may contain an input for radio frequency signals containing the long term feedback and/or the short term feedback, a signal recovery unit with sub-units such as a pre-amplification unit, a decoding unit, demodulation unit for extracting information of the long term feedback and/or of the short term feedback from the received radio frequency signals, and an output for the information of the long term feedback and/or of the short term feedback. In some embodiments the means for receiving can be implemented partly in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

In embodiments, the means for determining may correspond to any determining unit, determination unit, determining module, determination module, recovering module or recovering unit for obtaining the first short term information and the at least second short term information from the short term feedback based on the distribution of radio resource units. Hence, in embodiments, the means for retrieving may contain an input for the information of the long term feedback and the short term feedback, an algorithm, which obtains the distribution of radio resource units based on the information of the long term feedback and which obtains the first short term information and the at least second short term information from the short term feedback based on the obtained distribution of radio resource units and an output for the first short term information and the at least second short term information. In some embodiments the means for retrieving can be implemented in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

The embodiments of the invention provide a radio resource efficient feedback transmission scheme for downlink CoMP. The feedback transmission scheme is also flexible and scalable for varying numbers of radio cells, which cooperate for downlink CoMP transmission from a radio communication system to a mobile station.

According to a preferred embodiment, the distribution of radio resource units may be jointly determined for the first transmission channel and for the at least one second transmission channel.

The joint determination of the distribution of radio resource units allows for a distribution of radio resource units across most relevant parts for channel station information required at the multipoint transmitter. Thereby, a squared error distortion may be minimized to a non-quantized channel. This means for example with respect to a distortion metric in frequency domain, that a so-called complex CTF vector (CTF=Channel Transfer Function) of a quantized channel is subtracted from a non-quantized CTF and an absolute square of this result is averaged.

In a further preferred embodiment, the first short term information may relate to at least one first transmission path from one of a single antenna element or of several antenna elements of the first antenna system to one of a single antenna element or of several antenna elements of the antenna system of the network node and the at least second short term information may relate to at least one second transmission path from one of a single antenna element or of several antenna elements of the at least second antenna system to one of the single antenna element or of the several antenna elements of the antenna system of the network node.

According to even further preferred embodiments, for an orthogonal frequency-division multiplexing transmission via the first transmission channel and the at least second transmission channel the first short term information may contain a first set of coefficients allowing to reconstruct a frequency-domain channel transfer function of the at least one first transmission path and the at least second short term information may contain at least one second set of coefficients allowing to reconstruct a frequency-domain channel transfer function of the at least one second transmission path or, e.g. for a code division multiple access transmission or a wideband code division multiple access transmission via the first transmission channel and the at least second transmission channel, the first short term information may contain a first set of coefficients allowing to reconstruct a frequency-domain channel transfer function or a time-domain channel impulse response of the at least one first transmission path and the at least second short term information may contain at least one second set of coefficients allowing to reconstruct a frequency-domain channel transfer function or a time-domain channel impulse response of the at least one second transmission path. The frequency-domain channel transfer functions may be preferably complex-valued.

Preferably, the distribution of radio resource units may contain at least one radio resource unit for each transmission channel of a reporting cluster predefined by the receiver apparatus.

With respect to the above described embodiments, the distribution of radio resource units may be preferably determined by a reverse water-filling algorithm. The reverse water-filling algorithm may contain for example the sub-steps of incrementally reducing a water filling level and allocating radio resource units to the at least first quality value and the at least second quality value depending on levels each of the at least first quality value and the at least second quality value exceeding the water filling level. The term "reverse waterfilling" hereby refers e.g. to a technique that columns of inverted/reverse quality or power levels get filled by a certain amount of "water", which are a total amount of available bits and that a resulting per-column water level represents an amount of allocated bits for this respective column.

In preferred embodiments, the long term feedback may further contain at least one first time delay value for the at least one first quality value and at least one second time delay value for the at least one second quality value. The at least first quality value may be a first power value and the at least second quality value may be a second power value.

In further preferred embodiments, the at least one first time delay value and the at least first power value may be determined for at least one first local maximum of a first channel impulse response averaged over first channel impulse responses for first transmission paths of the first transmission channel between one of a single antenna element or of several antenna elements of the first antenna system to one of a single antenna element or of several antenna elements of the antenna system of the network node and the at least second time delay value and the at least second power value may be determined for at least one second local maximum of a second channel impulse response averaged over second channel impulse responses for transmission paths of the at least second transmission channel between one of a single antenna element or of several antenna elements of the at least second antenna system to one of the single antenna element or of the several said antenna elements of the antenna system of the network node.

The first channel impulse response and the second channel impulse response may be time-domain channel impulse responses. A temporal averaging with the long term time interval and a spatial averaging across the transmission paths of a transmission channel over the time-domain channel impulse responses may be called a power-delay profile for a transmission channel.

Preferably, the first channel impulse response may be obtained by averaging over first channel impulse responses for all possible transmission paths of the first transmission channel and the at least second channel impulse response may be obtained by averaging over second channel impulse responses for all possible transmission paths of the at least second transmission channel.

In even further preferred embodiments, the determining step for the distribution of radio resource units may allocate radio resource units to the at least first local maximum and to the at least second local maximum.

With respect to a preferred embodiment, the long term feedback may be only transmitted for local maxima of the averaged first channel impulse response and of the averaged at least second channel impulse response with an allocated number of radio resource units larger than zero.

According to two alternative embodiments, the transmitting step for the long term feedback may be repeated by the long term time interval or repeated, when the distribution of radio resource units has been changed by the determining step for the distribution of radio resource units.

Preferably, the method carried out by the receiver apparatus may further contain the step of determining the distribution of radio resource units based on the at least one first quality value and the at least one second quality value.

According to preferred embodiments, the short term feedback may contain first short term transmission channel parameters for the first transmission channel and at least second short term transmission channel parameters for the at least second transmission channel and a number of the first short term transmission channel parameters and a number of the at least second short term transmission channel parameters may correspond to the distribution of radio resource units. The first short term transmission channel parameters may correspond to the first set of coefficients and the at least second short term transmission channel parameters may correspond to the at least second set of coefficients.

In a preferred embodiment, the long term feedback may further contain indications of coverage areas of the first antenna system and the at least second antenna system such as Cell IDs (ID=identification).

In even further various embodiments, the distribution of radio resource units may be implicitly transmitted from the transmitter apparatus to the receiver apparatus by the transmission of the at least first quality value and the at least second quality value.

Preferably, the transmitter apparatus may have received from the radio communication system a signaling message, which contains indications for transmission channels or radio cells to report on and an ordering of the indications for the transmission channels or the radio cells defines an ordering of the information for the transmission channels or the radio cells within the long term feedback and/or the short term feedback.

According to further embodiments, the first short term information may be first fast varying channel information for the first transmission channel and at least second short term information may be at least second fast varying channel information for the at least second transmission channel, and the method carried out by the receiver apparatus may further contain the step of scaling the first fast varying channel information with the at least first power value of the long term feedback and the at least second fast varying channel information with the at least second power value of the long term feedback.

Further advantageous features of the embodiments of the invention are defined and are described in the following detailed description.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

Figure 1:
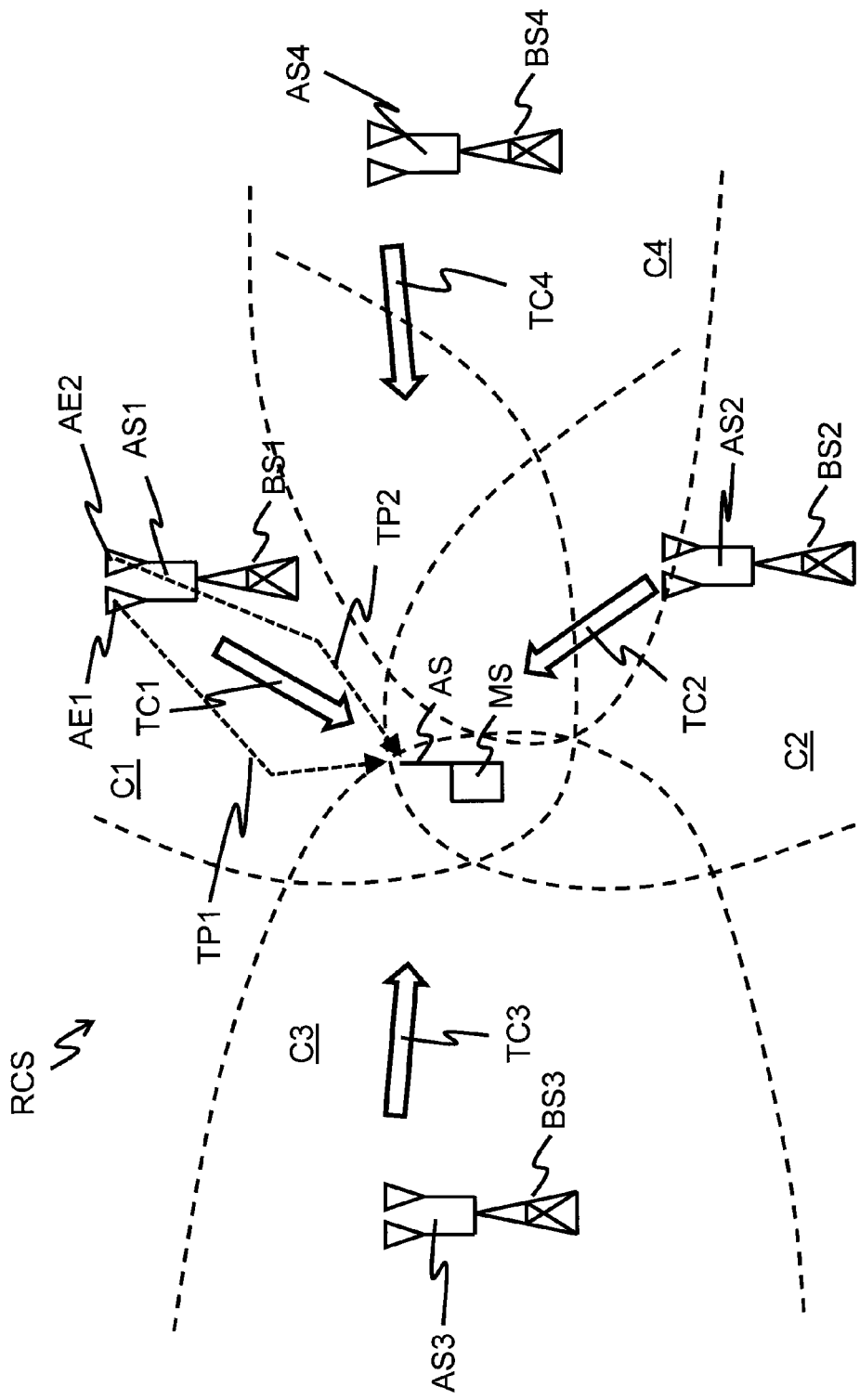
FIG. 1 shows schematically a block diagram of an exemplarily radio communication system, which contains four base stations and a mobile station.

FIG. 1 shows schematically a radio communication system RCS, which contains exemplarily four base stations BS1, BS2, BS3, BS4. Connections such as cable connections, fibre connections or wireless connections between the four base stations BS1, BS2, BS3, BS4, e.g. X2 interfaces such as specified for 3GPP LTE radio communication networks, are not shown for simplification. Also further base stations, other network nodes of the radio communication system RCS and corresponding connections are not shown for simplification. The radio communication system RCS may be for example a WLAN such as defined by IEEE 802.11 standards, a WiMAX network (WiMAX=Worldwide Interoperability for Microwave Access) such as one of the IEEE 802.16 family of wireless-networks standards being ratified by the WiMAX Forum or an LTE radio network (LTE=Long Term Evolution) such as defined by 3GPP (3GPP=Third Generation Partnership Project).

The term "base station" may be considered synonymous to and/or referred to as a base transceiver station, access point base station, access point, macrocell, microcell, femtocell, picocell etc. and may describe equipment that provides wireless connectivity via one or more radio links to one or more mobile stations.

A first base station BS1 may contain an antenna system AS1 with two antenna elements and may transmit and receive radio frequency signals within a first radio cell C1. In a same way, a second base station BS2 may contain an antenna system AS2 with two antenna elements and may transmit and receive radio frequency signals within a second radio cell C2, a third base station BS3 may contain an antenna system AS3 with two antenna elements and may transmit and receive radio frequency signals within a third radio cell C3 and a fourth base station BS4 may contain an antenna system AS4 with two antenna elements and may transmit and receive radio frequency signals within a fourth radio cell C4. The base stations BS1, BS2, BS3 and BS4 may be operated exemplarily according to the LTE OFDM transmission scheme in an FDD transmission mode with a first frequency range for downlink transmissions and a second frequency range for uplink transmissions.

Various alternative embodiments for the radio communication system RCS are possible:

Some of the base stations may be replaced by RRHs; e.g. the first base station BS1 may be connected to a first RRH, which replaces the second base station BS2 and the first base station BS1 may be connected to a second RRH, which replaces the third base station BS3. Thereby, the radio cells C1, C2 and C3 may be different sectors of an overall radio cell of the first base station BS1. The antenna systems AS1, AS2, AS3, and AS4 may contain different numbers of antenna elements; e.g. the first antenna system AS1 may contain four antenna elements, the second antenna system AS2 may contain a single antenna element, the third antenna system AS3 may contain two antenna elements, and the fourth antenna system AS4 may contain four antenna elements. The base stations BS1, BS2, BS3 and BS4 may be a mixture of macro base stations and femto base stations to constitute a so-called heterogeneous network.

A mobile station MS, which contains an antenna system AS with for example a single antenna element, may be located exemplarily in an overlap region of the first radio cell C1, the second radio cell C2, the third radio cell C3 and the fourth radio cell C4. Further mobile stations are not shown for simplification.

The term "mobile station" may be considered synonymous to, and may hereafter be occasionally referred to, as a mobile unit, mobile user, access terminal, user equipment, subscriber, user, remote station etc. The mobile station MS may be for example a cellular telephone, a portable computer, a pocket computer, a hand-held computer, a personal digital assistant or a vehicle-mounted mobile device.

In alternative embodiments, the mobile station MS may be replaced by a repeater or a relay, which means, that a downlink CoMP transmission may be applied towards the repeater or the relay. The term "repeater" may be considered synonymous to and/or referred to as an electronic device that receives a signal and simply retransmits it at a higher level or higher power, or onto another side of an obstruction, so that the signal can cover longer distances. The term "relay" may be considered synonymous to and/or referred to as an electronic device that receives a signal and retransmits a different signal not only at a higher level or higher power, but also at a different frequency and/or different time slot and/or spreading code, to increase capacity in a wireless access network and to improve wireless link performance. Due to the location of the mobile station MS at borders of the radio cells C1, C2, C3 and C4, the antenna systems AS1, AS2, AS3 and AS4 and corresponding base stations BS1, BS2, BS3 and BS4 are potential candidates for a downlink CoMP transmission towards the mobile station MS. A qualification of the antenna systems AS1, AS2, AS3 and AS4 for being part of a multipoint transmitter for the downlink CoMP transmission may be based on a reception quality of first reference signals transmitted from the first base station BS1 via a first transmission channel TC1, of second reference signals transmitted from the second base station BS2 via a second transmission channel TC2, of third reference signals transmitted from the third base station BS3 via a third transmission channel TC3 and of fourth reference signals transmitted from the fourth base station BS4 via a fourth transmission channel TC4 towards the mobile station MS, which receives and measures the reference signals and performs an evaluation of the reception quality of the reference signals with respect to the various transmission channels TC1, TC2, TC3 and TC4.

The first transmission channel TC1 may consist of a first transmission path TP1 on which the first reference signals propagate from a first antenna element AE1 of the first antenna system AS1 to the antenna element of the antenna system AS of the mobile station MS and of a second transmission path TP2 on which the second reference signals propagate from a second antenna element AE2 of the first antenna system AS1 to the antenna element of the antenna system AS of the mobile station MS. The first transmission path TP1 and the second transmission path TP2 may be affected by the environment between the first antenna system AS1 and the antenna system AS and may be based on reflections and scattering (a single reflection is shown exemplarily for the first transmission path TP1 and the second transmission path TP2 in FIG. 1). The second transmission channel TC2, the third transmission channel TC3 and the fourth transmission channel TC4 may consist of similar transmission paths, which are not shown in FIG. 1 for simplification.

The term "reference signal" may be considered synonymous to and/or referred to as a reference symbol, CSI-reference symbol (CSI=Channel State Information), pilot, pilot signal, pilot symbol, beacon, beacon signal etc.

The mobile station MS may signal channel feedback on an uplink transmission channel to a master base station such as the first base station BS1, which coordinates the downlink CoMP transmission or to several base stations of a so-called downlink CoMP cluster, which are coordinated according to a so-called uplink CoMP reception scheme. Details of the channel feedback will be given below with respect to a description of the FIGS. 2 to 5. The channel feedback is used by the radio communication system RCS to optimize the downlink CoMP transmission towards the mobile station MS or to decide, whether a downlink CoMP transmission or a single point to single point transmission is more suitable. The downlink CoMP transmission scheme may be optimized for example by selecting adequate antenna systems for the multipoint transmitter or by selecting a more suitable coding scheme and/or a more suitable modulation scheme.

The master base station BS1 for the downlink CoMP transmission may determine a reporting cluster for the mobile station MS depending on a current location of the mobile station MS within the radio cells C1, C2, C3 and C4 of the radio communication system RCS. The reporting cluster contains those radio cells, for which the mobile station MS shall provide a channel feedback. The master base station BS1 may transmit and signal information of the reporting cluster to the mobile station MS for example by signalling cell IDs of the radio cells for which the mobile station MS shall generate long term and short term feedback reports. With respect to FIG. 1, the master base station BS1 may for example decide to determine a reporting cluster based on the first base station BS1, the second base station BS2 and the third base station BS3. The fourth base station BS4 may be omitted for example because of a larger distance between the fourth base station BS4 and the mobile station MS than corresponding distances between the base stations BS1, BS2 and BS3 and the mobile station MS. Other decision criteria such as the following ones are possible: The distance can be meant in the sense of different downlink receive signal powers per radio cell, or it can be drawn from location information using a data base of per-cell receive power levels depending on a current position of the mobile station. Furthermore, a total number of radio cells to report on may be limited by the master base station BS1. For supporting a decision of the master base station BS1 with respect to members of the reporting cluster, past handover measurements may be used, containing e.g. also receive signal power levels of different radio cells. Alternatively, the master base station BS1 may estimate a resulting channel capacity of a potential coordination set and include only radio cells as members of the reporting cluster which are significantly able to increase a resulting capacity after coordination.

The master base station BS1 or a further network node of the radio communication system RCS such as an operation and maintenance network node may further determine a size of a predefined feedback radio resource for signalling a so-called short term feedback from the mobile station MS to the master base station BS1. The size of the predefined feedback radio resource may be determined for example by reserving for the predefined feedback radio resource a predefined number of bits of an overall uplink radio resource. In case of a multipoint transmitter with four antenna systems each containing two antenna elements and the mobile station MS containing a single antenna element, the size of the predefined feedback radio resource of the short term feedback may be for example in a range between 25 and 30 bits.

The master base station BS1 or the further network node of the radio communication system RCS may further determine a long term time interval such as 100 ms for signalling a long term feedback from the mobile station MS and from further mobile stations to the master base station BS1. The long term time interval may be preferably adapted to a speed of changes within a so-called large scale scattering environment, thus e.g. when dominant scattering clusters of radio wave propagation have significantly changed, e.g. by a notable change of time delay (e.g. a fraction of an order of an OFDM symbol time sample) or new dominant scattering objects for radio frequency signals appear or disappear, e.g. when the mobile station MS moves around a corner of a house. Such a change of the large scale scattering environment may happen, when the mobile station MS has moved a distance of more than for example 100 carrier frequency radio wavelengths (essentially the number of carrier frequency radio wavelengths depends on a signal bandwidth of the downlink CoMP transmission) or when scattering objects such as cars or trucks have moved into a region or out of a region of transmission paths of a transmission channel.

The master base station BS1 or the further network node of the radio communication system RCS may further determine a short term time interval such as 10 ms for signalling the short term feedback from the mobile station MS to the master base station BS1. The short term time interval may be preferably adapted to a speed of changes within a so-called fast fading environment. The fast fading environment may change, when the current position of the mobile station MS may be changed within a fraction of a carrier frequency radio wavelength. Thereby, phases and amplitudes of receive signals may be already altered, e.g. by the Doppler effect. Fast fading results in variations of amplitudes and phases of the channel impulse response and thus also in the channel transfer function.

The master base station BS1 may transmit and signal information of the size of the predefined feedback radio resource, the long term time interval and the short term time interval to the mobile station MS for example when the master base station BS1 becomes a new master base station for the mobile station MS or when a change of available uplink radio resources exceeds a predefined size.

In an alternative embodiment, the size of the predefined feedback radio resource, the long term time interval and the short term time interval may be already predefined at the master base station BS1 and the mobile station MS, when delivered.

For limiting processing resources at the mobile station MS, the mobile station MS may preferably only process received reference signals and only determine channel impulse responses for the transmission channels TC1, TC2 and TC3, which correspond to the received information of the reporting cluster.

The operation of the mobile station MS for transmitting the long term feedback and the short term feedback is described in the following with respect to FIGS. 2, 3 and 4.

Figure 2A:
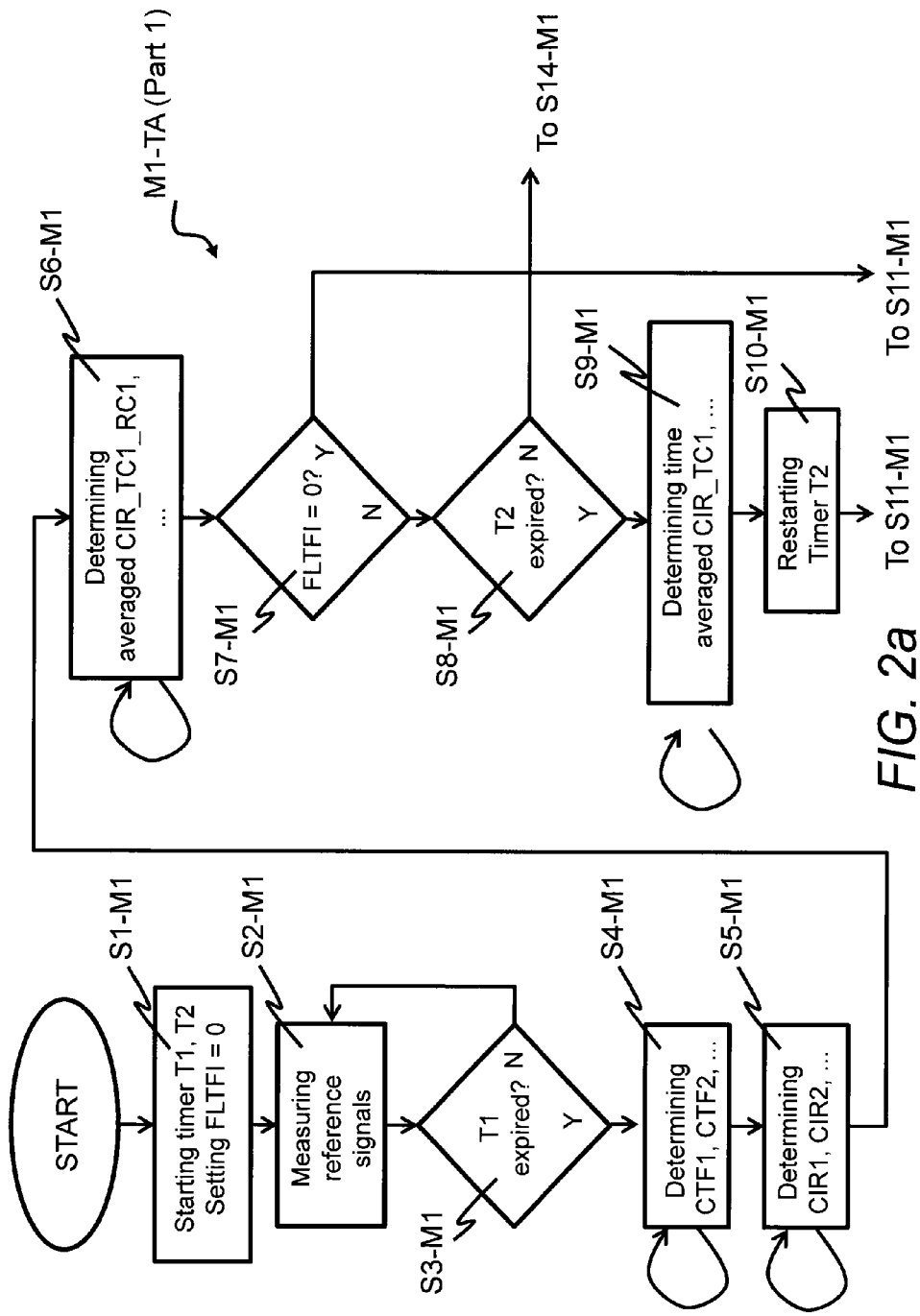
FIG. 2a shows schematically a first part of an exemplarily flow diagram of a method of a transmitter apparatus.
Figure 3:
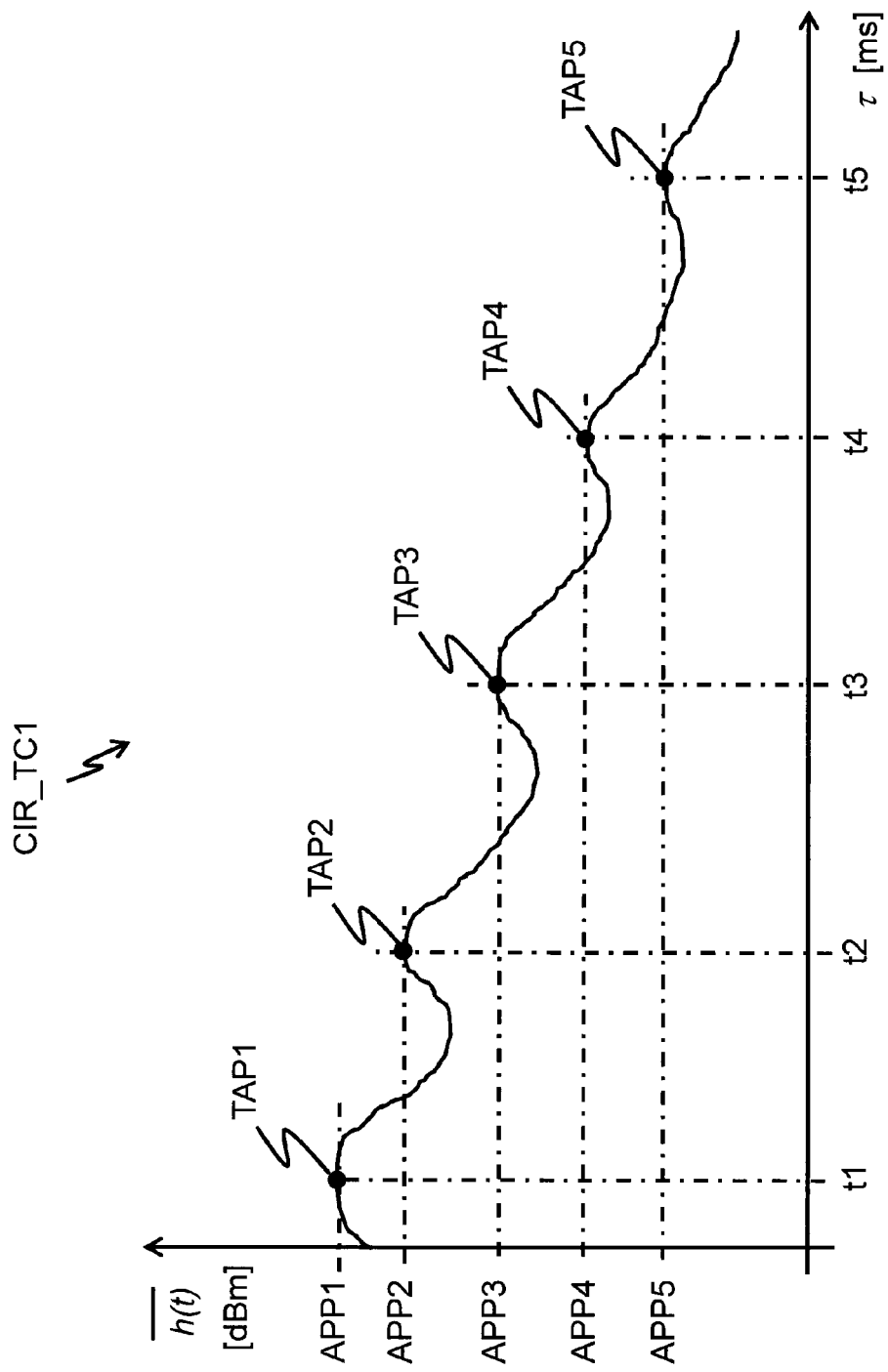
FIG. 3 shows a characteristic diagram of an exemplarily averaged channel impulse response as a function of time delay, which has been determined by the transmitter apparatus.

FIG. 2a shows a first part of a flow diagram of a method M1-TA, which may be for example performed by a transmitter apparatus of the mobile station MS. The number of the steps for performing the method M1-TA is not critical, and as can be understood by those skilled in the art that the number of the steps and the sequence of the steps may vary without departing from the scope of the embodiments of the invention as defined in the appended claims. The method M1-TA may be started for example, when the information about the reporting cluster, the size of the predefined feedback radio resource for the short term feedback, the long term time interval and the short term time interval have been transmitted a first time or may be restarted, when one of these parameters have been changed according to a new signalling message from the master base station BS1 to the mobile station MS.

In a first step S1-M1, a first timer T1 may be started according to the short term time interval and a second timer T2 may be started according to the long term time interval. Furthermore, an indicator FLTFI for having transmitted the long term feedback a first time may be set to zero.

According to a further step S2-M1, the reference signals, which have been received via the transmission channels TC1, TC2 and TC3 by different OFDM subcarriers within a predefined downlink frequency range such as an LTE frequency band of for example 20 MHz or may be limited to a sub-band of the LTE frequency band, are measured.

In a next step S3-M1, it is verified, whether the short term time interval of the first timer T1 has been expired. When the short term time interval has not been expired, the step S2-M1 may be executed again. When otherwise the short term time interval has been expired, step S4-M1 may be executed as a next step.

In the step S4-M1, a first channel transfer function CTF1 may be determined for example with respect to a first transmission path of the first transmission channel TC1 from a first antenna element of the first antenna system AS1 to a first antenna element of the antenna system AS of the mobile station MS. For simplification, the antenna system AS of the mobile station MS may contain only a single antenna element as shown in FIG. 1. A person skilled in the art may easily adapt the method M1-TA for a mobile station containing an antenna system with two or more antenna elements. The first channel transfer function CTF1 may be given for example by H(f) as a function of frequency f and may be determined for example according to Gunther Auer and Eleftherios Karipidis, Pilot Aided Channel Estimation for OFDM: A Separated Approach for Smoothing and Interpolation, 2005, Proceedings of the 40th IEEE International Conference on Communications (ICC), 2173-2178 by measuring the reference signals at the different OFDM subcarriers of the downlink transmission channels TC1, TC2 and TC3. The step S4-M1 may be preferably repeated for all other transmission paths of the first transmission channel TC1 (e.g. for obtaining a second channel transfer function CTF2 for a second transmission path of the first transmission channel TC1 from a second antenna element of the first antenna system AS1 to the first antenna element of the antenna system of the mobile station MS) and for obtaining further channel transfer functions for the further transmission channels TC2 and TC3.

In a further step S5-M1, a first channel impulse response CIR1 may be determined as a function h(t) of time t by performing an inverse discrete Fourier transformation of the first channel transfer function CTF1 such as described in Gunther Auer and Eleftherios Karipidis, Pilot Aided Channel Estimation for OFDM: A Separated Approach for Smoothing and Interpolation, 2005, Proceedings of the 40th IEEE International Conference on Communications (ICC), 2173-2178. The step S5-M1 may be preferably repeated for all other channel transfer functions, which have been determined during the step S4-M1 (e.g. a second channel impulse response CIR2 may be determined by an inverse discrete Fourier transformation of the second channel transfer function CTF2).

In a next step S6-M1, the channel impulse responses CIR1, CIR2, which belong to the first transmission path TC1 or to a set of co-located antenna elements of the first antenna system AS1, are averaged for example by applying a root mean square function to determine an averaged channel impulse response CIR_TC1_RC1 for a first reporting cycle of the short term feedback. The step S6-M1 may be preferably repeated for the other transmission channels TC2 and TC3, which means one repetition per set of co-located antenna elements of the second antenna system AS2 and the third antenna system AS3.

In a further step S7-M1, it is verified, whether the indicator FLTFI is set to zero. When the indicator FLTFI is set to zero, step S11-M1 will be executed as a next step. When the indicator FLTFI is not set to zero, step S8-M1 will be executed as a next step.

In the next step S8-M1, it is verified, whether the long term time interval of the second timer T2 has been expired. When the long term time interval has been expired, step S9-M1 may be executed as a next step. When the long term time interval has not been expired, step S14-M1 may be executed as a next step.

In the further step S9-M1, a time averaged channel impulse response CIR_TC1 for the first transmission channel TC1 may be determined for example in a following way: The averaged channel impulse response CIR_TC1_RC1 of the first reporting cycle of the short term feedback and further average channel impulse responses of further reporting cycles of the short term feedback within a reporting cycle of the long term feedback are averaged in time. The step S9-M1 may be preferably repeated for the further transmission channels TC2 and TC3, which means one repetition per set of co-located antenna elements of the second antenna system AS2 and the third antenna system AS3.

In a further step S10-M1, the second timer T2 may be restarted with the long term time interval.

Figure 2B:
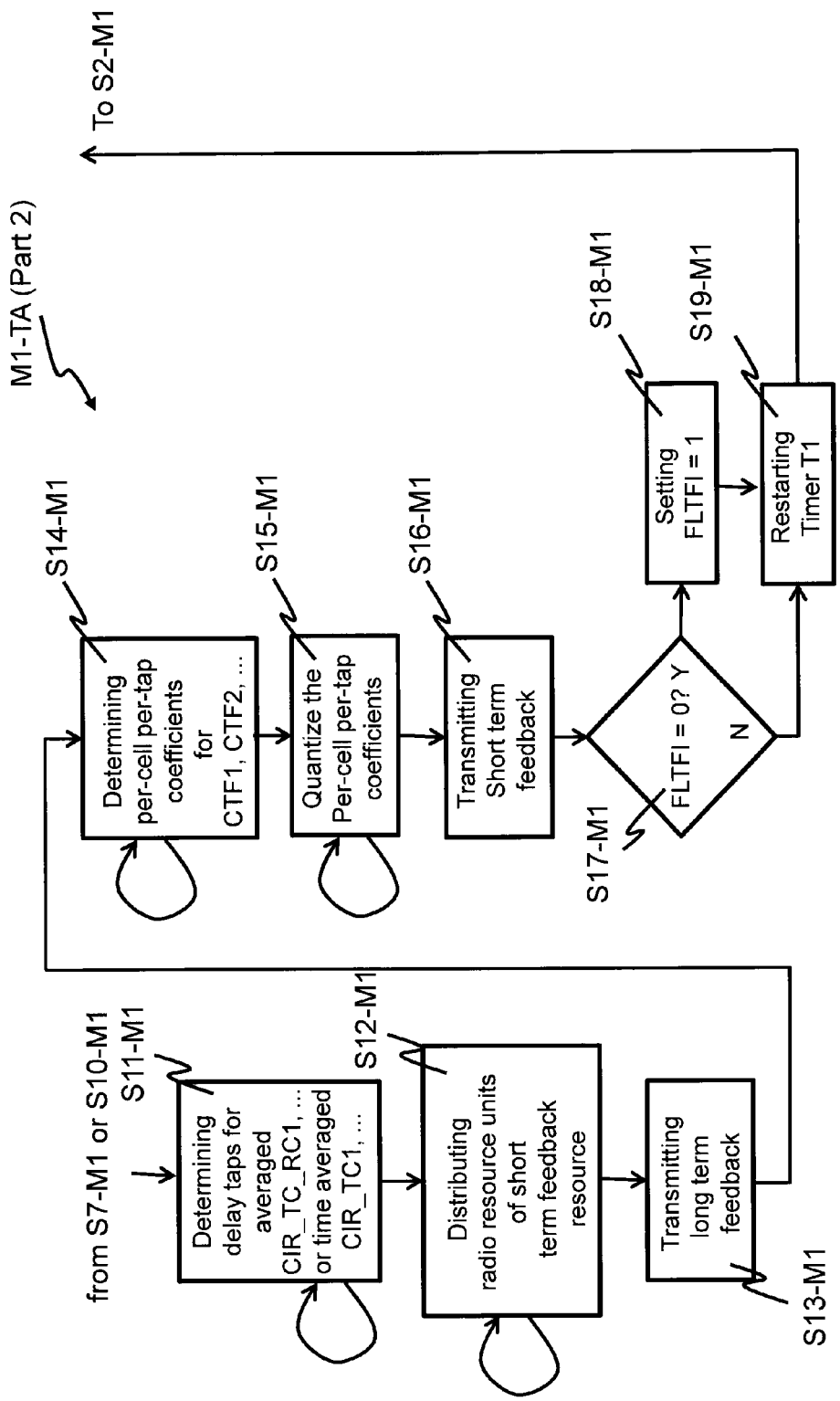
FIG. 2b shows schematically a second part of the flow diagram of the method of the transmitter apparatus according to the embodiment of the invention.

In the next step S11-M1 shown in FIG. 2b, so-called delay taps, their corresponding average path powers and their corresponding time delay values may be determined for the averaged channel impulse response CIR_TC1. The delay taps are local maximum values of a time average channel impulse response CIR_TC1 as a function of time delay $\tau$ as shown in FIG. 3. A path profiling scheme similar to a rake-finger selection algorithm such as described in T. Wild "A rake-finger based efficient channel state information feedback compression scheme", Vehicular Technology Conference (VTC 2010-Spring), 2010 IEEE 71$^{st}$, 16-19 May 2010 or more detailed in C. Cozzo, G. E. Bottomley, A. S. Khayrallah "Rake receiver finger placement for realistic channels", IEEE Wireless Communications and Networking Conference 2004, Vol. 1, pp. 316-321, 21-25 Mar. 2004 may be applied to identify most significant delay taps from a time-domain profile of the averaged channel impulse response CIR_ TC1_RC1 (not shown in FIG. 3), when the previous step was step S7-M1, or of the time averaged channel impulse response CIR_TC1 (as shown in FIG. 3), when the previous step was the step S9-M1. FIG. 3 shows exemplarily five delay taps TAP1, TAP2, TAP3, TAP4 and TAP5 of the time-domain profile of the time averaged channel impulse response CIR_TC1, which have been identified by the step S11-M1. Average path power values APP1, APP2, APP3, APP4 and APP5 as examples for first quality values of the first transmission channel TC1 and corresponding time delay values t1, t2, t3, t4 and t5 for the delay taps TAP1, TAP2, TAP3, TAP4 and TAP5 are also shown in FIG. 3. The step S10-M1 may be preferably repeated for the further averaged channel impulse responses of the further transmission channels TC2 and TC3.

By an alternative embodiment for obtaining a more fine granular resolution of the delay taps, search algorithms such as a so-called OMP (OMP=Orthogonal Matching Pursuit) as described in J. A. Tropp, A. C. Gilbert "Signal Recovery From Random Measurements Via Orthogonal Matching Pursuit", IEEE Transactions on Information Theory, Vol. 53, No. 12, pp. 4655-4666, December 2007 may be applied.

In a further step S12-M1, a distribution of radio resource units of the predefined radio resource for the short term feedback may be determined for example in a following way: The predefined feedback radio resource for the short term feedback may be split into a first segment for a repeated transmission of the short term feedback for the first transmission channel TC1 and at least one second segment for a repeated transmission of the short term feedback of the second transmission channel TC2 and the third transmission channel TC3 depending on the at least first quality values and the at least second quality values. In exception is applied, when the method M1-TA has been started or restarted. In such a case, the at least first quality values and the at least second quality values are not averaged over the long term time interval but instantaneous quality values or quality values averaged over the short term time interval may be applied. The quality values may be for example the average path power values APP1, APP2, APP3, APP4 and APP5, which have been determined during the step S11-M1.

A bit allocation to the segments of the predefined feedback radio resource may be determined for example by applying a reverse water-filling algorithm such as described in T. Cover, J. Thomas "Elements of Information Theory", Wiley, Second Edition, 2006, section 10.3.3. Thereby, the bit allocation problem may be treated similar to a source coding problem of independent Gaussian sources and the reverse water-filling algorithm may provide an optimal solution in a sense of Shannon's rate-distortion theory with squared error distortion. FIG. 4 shows an exemplarily power delay profile diagram PDPD for the delay taps of the transmission channels TC1, TC2 and TC3. A height of the adjacent rectangles of the power delay profile diagram PDPD is defined by the average path power values APP1, APP2, APP3, APP4 and APP5, which have been determined by the step S11-M1. For the exemplarily embodiment shown in FIG. 4, five delay taps have been identified in the step S11-M1 for each of the transmission channels TC1, TC2 and TC3. In alternative embodiments, different numbers of delay taps may have been identified for the transmission channels TC1, TC2 and TC3.

The reverse water-filling algorithm may be executed for example in a following way: The algorithm starts by setting a reverse water-filling level RWL (shown by a dotted line in FIG. 4 a) at a predefined quality value P-QV, by setting radio resource counters for each delay tap to zero and by setting a radio resource counter for the predefined radio resource of the short term feedback to half the size as predefined by the master base station BS1. The predefined quality value P-QV may set for example to a quality value, which is a sum of a largest average path power value of the transmission channels TC1, TC2 and TC3 and of a predefined offset path power value.

According to a preferred embodiment, for each radio cell (for each transmission channel) of the reporting cluster a radio resource counter for a delay tap with a largest average path power value may be set initially to one radio resource unit (e.g. 1 bit) and the initial radio resource counter for the predefined radio resource of the short term feedback may be decreased correspondingly. Thereby, it can be achieved, that for all radio cells at least a small amount of channel state information is reported from the mobile station MS to the master base station BS1.

The radio resource counter for the predefined radio resource of the short term feedback is preferably set to half the size of the predefined radio resource because radio resource units maybe be preferably allocated pair-wise, which means that at least one radio resource unit may be allocated for transmitting a real part of a time-domain short-term coefficient vector C and at least one further radio resource unit may be allocated for transmitting an imaginary part of the coefficient vector C.

The time-domain short-term coefficient vector C may be designed as a least square solution for approximating one of the channel transfer functions CTF1, CTF2, . . . as a function of a so-called tap-based DFT matrix D (DFT=Discrete Fourier Transform) as described in T. Wild "A rake-finger based efficient channel state information feedback compression scheme", Vehicular Technology Conference (VTC 2010-Spring), 2010 IEEE 71$^{st}$, 16-19 May 2010.

Then, the reverse water-filling level RWL (shown by a dashed line in FIG. 4 a) may be lowered (indicated by an arrow in FIG. 4 a) by an incremental quality value ΔQV and it is verified, whether one of the quality values of the delay taps exceeds or hits the reverse water-filling level RWL. If none of the quality values of the delay taps exceeds or hits the reverse water-filling level RWL, the reverse water-filling level RWL may be lowered again by an incremental quality value ΔQV and it is verified again, whether one of the quality values of the delay taps exceeds or hits the reverse water-filling level RWL. If one of the quality values of the delay taps exceeds or hits the reverse water-filling level RWL, a radio resource counter such as a certain bit budget of the corresponding delay tap may be increased by one radio resource unit, which may be for example a single bit. At a same time, the radio resource counter for the predefined radio resource of the short term feedback is decreased by one radio resource unit, which may also for example also a single bit. In further sub-steps the reverse water-filling level RWL is lowered by further incremental quality values ΔQV and after each sub-step it is verified, which of the quality values of the delay taps exceed or hit the reverse water-filling level RWL and to which extend. When one of the quality values of the delay taps already exceed or hit the reverse water-filling level RWL, the corresponding counter may be increased for example each time by one radio resource unit for each further incremental reduction of the reverse water-filling level RWL.

The algorithm as described in T. Cover, J. Thomas "Elements of Information Theory", Wiley, Second Edition, 2006, section 10.3.3 may be used to determine how many radio resource units shall be allocated to a delay tap for an overshooting level, with which the quality value exceeds the reverse water-filling level RWL.

The reverse water-filling algorithm may be iteratively repeated, until the radio resource counter for the predefined radio resource of the short term feedback is decreased to zero. When the radio resource counter for the predefined radio resource of the short term feedback is decreased to zero, the reverse water-filling algorithm is stopped. In such a way, a total sum distortion over all delay taps is minimized.

Figure 4:
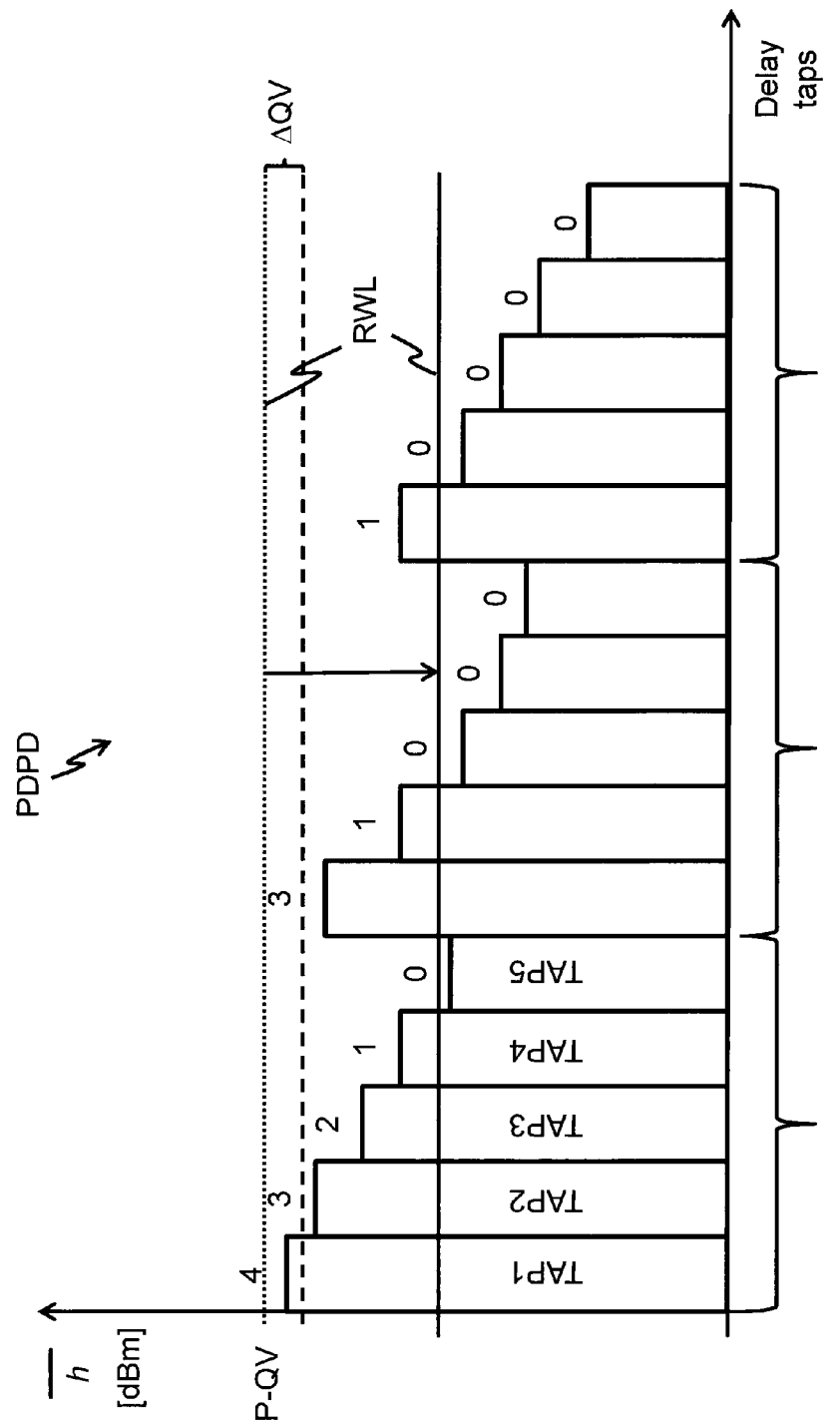
FIG. 4 shows an exemplarily power delay profile diagram and two alternatives for a calculation of a distribution of radio resource units with respect to so-called delay taps of channel impulse responses of three transmission channels, which have been determined by the transmitter apparatus.
Figure 4:
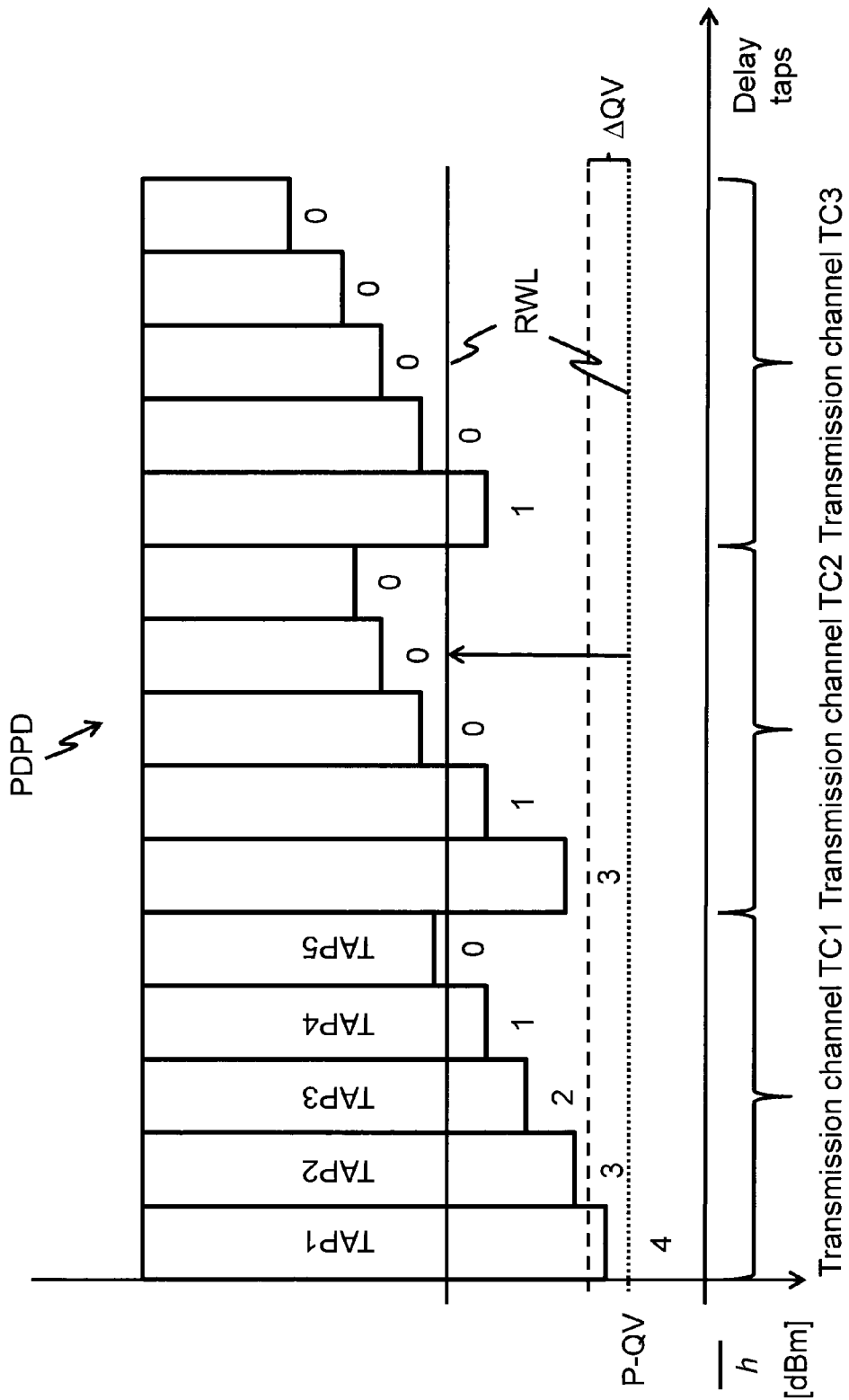

FIG. 4 b) shows a similar power delay profile diagram as shown in FIG. 4 a) but with an inverted ordinate. In such a case, the reverse water-filling level RWL is incrementally increased, until the radio resource counter for the predefined radio resource of the short term feedback is decreased to zero.

Numbers above the rectangles shown in FIG. 4 may correspond to numbers of digital bits, which are allocated to the respective delay taps for a position of the reverse water-filling level RWL shown in FIG. 4 by a solid line after having distributed all available digital bits of the predefined radio resource to the transmission channels TC1, TC2 and TC3. Each digital bit may generate approximately 6 dB of a reverse water level, which corresponds to a 6 dB reduction of quantization noise in Gaussian sources.

Added radio resource units of the delay taps TAP1, TAP2, TAP3 and TAP4 of the averaged channel impulse response CIR_TC1 of the first radio cell C1 may represent a first segment of the predefined radio resource of the short term feedback, added radio resource units of the second radio cell C2 may represent a second segment of the predefined radio resource of the short term feedback and added radio resource units of the third radio cell C3 may represent a third segment of the predefined radio resource of the short term feedback.

In a further step S13-M1, the long term feedback is transmitted from the mobile station MS to the master base station BS1 by radio frequency signals from the antenna system AS to one or several of the antenna systems AS1, AS2, AS3 and AS4. The long term feedback may contain for example the time delay values t1, t2, t3 and t4 and the average path power values APP1, APP2, APP3 and APP4 for the delay taps with respect to the first transmission channel TC1 and corresponding time delay values and average path power values for the second transmission channel TC2 and the third transmission channel TC3. Preferably, cell Ids are also transmitted so that the master base station BS1 is able to perform a mapping of received time delay values and received average path power values to radio cells C1, C2 and C3 (or to corresponding transmission channels TC1, TC2 and TC3 accordingly) of the reporting cluster. Preferably, the average path power values APP1, APP2, APP3 and APP4 may be logarithmically quantized before transmission. Therefore, in a first alternative one of the average path power values may be transmitted as a logarithmically quantized absolute value and remaining average path power values may be transmitted as logarithmically quantized relative values. According to a second alternative, a logarithmically quantized average path power value may be predefined at the master base station BS1 and the mobile station MS and the mobile station MS may report for each average path power value a logarithmically quantized relative power value, which has been obtained for example by subtracting a logarithmically quantized average path power value from the predefined logarithmically quantized average path power value.

In a next step S14-M1, a time-domain short-term coefficient vector $C_{TD1}$ for the first channel transfer function CTF1, which has been determined in step S4-M1, may be determined (the abbreviation TD in the index of the coefficient vector $C_{TD1}$ stands for Time Domain and the number 1 stands for the first channel transfer function CTF1). In case of an OFDM downlink CoMP transmission, the coefficient vector $C_{TD1}$ may be determined for example as a least squares solution based on equation (8) as described in T. Wild "A rake-finger based efficient channel state information feedback compression scheme", Vehicular Technology Conference (VTC 2010-Spring), 2010 IEEE 71$^{st}$, 16-19 May 2010. Therefore, in a first sub-step a tap-based DFT matrix $D_{C1}$ is determined for the first radio cell C1 based on equations (4) to (6) as described in T. Wild "A rake-finger based efficient channel state information feedback compression scheme", Vehicular Technology Conference (VTC 2010-Spring), 2010 IEEE 71$^{st}$, 16-19 May 2010 using the time delay values t1, t2, t3, t4 and t5, which are consistent with the tap delays $\tau_m$ of equation (5). A number of elements of the coefficient vector $C_{TD1}$ correspond to a number of delay taps for which at least one radio resource unit has been allocated in the step S12-M1. With respect to the exemplary embodiment shown in FIG. 4, the number of elements of the coefficient vector $C_{TD1}$ is 4.

The step S14-M1 may be repeated for the other channel transfer functions CTF2 etc. of the first radio cell C1 and for the further channel transfer functions of the further radio cells C2 and C3 with corresponding sub-steps for determining tap-based DFT matrices $D_{C2}$, $D_{C3}$.

In a further step S15-M1, the elements of the coefficient vector $C_{TD1}$ may be quantized by applying for example the well-known uniform scalar quantization in a following way: In a first sub-step, a real part and an imaginary part of a first element of the coefficient vector $C_{TD1}$ may be quantized according to the number of radio resource units, which have been determined by the step S12-M1 for the first delay tap TAP1, e.g. the real part of the first element may be quantized by four bits and the imaginary part of the first element may be quantized by four bits (see FIG. 4 a). In a second sub-step, a real part and an imaginary part of a second element of the coefficient vector $C_{TD1}$ may be quantized according to the number of radio resource units, which have been determined by the step S12-M1 for the second delay tap TAP2, e.g. the real part of the second element may be quantized by three bits and the imaginary part of the second element may be quantized by three bits (see FIG. 4 a). In a corresponding way, the other elements of the coefficient vector $C_{TD1}$ may be quantized.

The step S15-M1 may be repeated for the second channel transfer function CTF2 for determining quantized real parts and quantized imaginary parts of elements of a coefficient vector $C_{TD2}$, may be repeated for further channel transfer functions of the first transmission channel TC1 and may be repeated for further channel transfer functions of the further transmission channels TC2 and TC3.

In a further step S16-M1, the short term feedback is transmitted from the mobile station MS to the master base station BS1 by radio frequency signals from the antenna system AS to one or several of the antenna systems AS1, AS2, AS3 and AS4. The short term feedback may contain the quantized real part and quantized imaginary part of elements of the coefficient vectors $C_{TD1}$, $C_{TD2}$, etc. which have been determined by the step S15-M1.

According to an alternative embodiment, when a code division multiple access transmission or a wideband code division multiple access transmission may be applied for a downlink CoPM transmission in the radio communication system, the short term feedback may contain sets of coefficient vectors allowing to reconstruct frequency-domain channel transfer functions or time-domain channel impulse responses of the transmission channels TC1, TC2 and TC3.

In a further step S17-M1, it may be verified, whether the indicator FLTFI is set to zero. When the indicator FLTFI is set to zero, step S18-M1 may be executed as a next step. When the indicator FLTFI is not set to zero, step S19-M1 may be executed as a next step.

In the next step S18-M1, the indicator FLTFI may be set to "1".

In the further step S19-M1, the first timer T1 may be restarted with the short term time interval.

The next step after the step S19-M1 may be again the step S2-M1.

Figure 5:
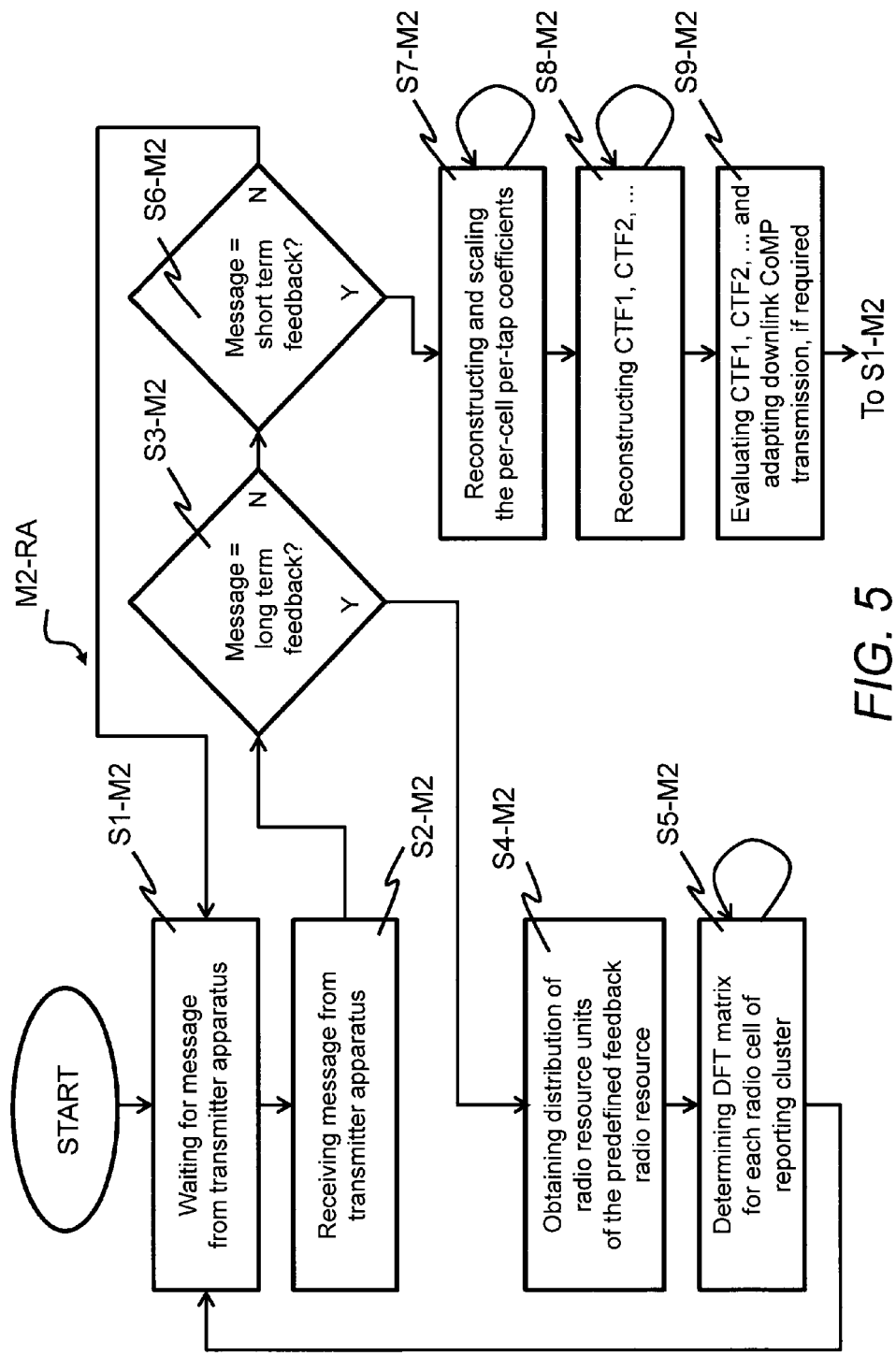
FIG. 5 shows schematically an exemplarily flow diagram of a method of a receiver apparatus.

FIG. 5 shows a flow diagram of a method M2-RA, which may be for example performed by a receiver apparatus of the master base station BS1. The number of the steps for performing the method M2-RA is not critical, and as can be understood by those skilled in the art that the number of the steps and the sequence of the steps may vary without departing from the scope of the embodiments of the invention as defined in the appended claims. The method M2-RA may be started, when the information about the reporting cluster, the predefined radio resource, the long term time interval and the short term time interval have been transmitted a first time or may be restarted, when one of these parameters have changed according to a new signalling message from the master base station BS1 to the mobile station MS.

In a first step S1-M2, the receiver apparatus may be in a waiting state for receiving any signalling message from the transmitter apparatus.

In a next step S2-M2, a signalling message may be received from the transmitter apparatus.

In a further step S3-M2, it may be verified, whether the received signalling message is a long term feedback message. When the received signalling message is a long term feedback message, step S4-M2 may be executed as a next step. When the received signalling message is not a long term feedback message, step S6-M2 may be executed as a next step.

In the next step S4-M2, the distribution of radio resource units such as an allocation of quantization bits per delay tap of each transmission channel TC1, TC2 and TC3 of the predefined feedback radio resource for the short term feedback of the first transmission channel TC1, the second transmission channel TC2 and the third transmission channel TC3 may be obtained and determined based on the received long term feedback message for example in a following way: In a first sub-step, the receiver apparatus may extract from the long term feedback message the time delay values t1, t2, t3 and t4 and the average path power values APP1, APP2, APP3 and APP4 for the delay taps with respect to the first transmission channel TC1 and the corresponding time delay values and average path power values for the second transmission channel TC2 and the third transmission channel TC3. In a second sub-step, the receiver apparatus may generate a similar power delay profile diagram as shown in FIG. 4 but without the rectangles for which no radio resource units have been allocated by the transmitter apparatus. In a third sub-step, the receiver apparatus may apply the same reverse water-filling algorithm as described with respect to the step S12-M1. Thereby, the receiver apparatus obtains a distribution of radio resource units of the predefined feedback radio resource of the short term feedback with respect to the delay taps for which time delay values and average path power values have been reported. The distribution will be identical to a distribution obtained by the transmitter apparatus in the step S12-M1, when both—the transmitter apparatus and the receiver apparatus—apply a same predefined reverse water-filling algorithm.

According to an alternative embodiment, the distribution of radio resource units may be signalled from the transmitter apparatus to the receiver apparatus.

In a further step S5-M2, the tap-based DFT matrix $D_{C1}$ for the first radio cell C1 is determined by the receiver apparatus in a same way as described with respect to the step S14-M1. The step S5-M2 may be repeated for the further transmission channels TC2 and TC3 for determining the corresponding tap-based DFT matrices $D_{C2}$, $D_{C3}$.

Next step after the step S5-M2 may be again the step S1-M2.

In the further step S6-M2, it may be verified, whether the received signalling message is a short term feedback message. When the received signalling message is a short term feedback message, step S7-M2 may be executed as a next step. When the received signalling message is not a short term feedback message, the step S1-M2 may be executed again.

In the next step S7-M2, the elements of the coefficient vector $C_{TD1}$ with respect to the first channel transfer function CTF1 and more preferably real parts and imaginary parts of the elements of the coefficient vector $C_{TD1}$ may be reconstructed from the quantized real part and quantized imaginary part of elements of the coefficient vectors $C_{TD1}$, which are contained in the received short term feedback message. Therefore, the receiver apparatus may execute an algorithm, which may be inverse to the uniform scalar quantization performed by the transmitter apparatus, where a quantization may be carried out for example as either mid-tread or mid-rizer uniform quantizers. When a relative power value reporting may be applied as described with respect to the step S13-M1, the reconstructed elements of the coefficient vector $C_{TD1}$ may be scaled based on the reported or predefined absolute power value and the reported relative power values.

The step S7-M2 may be repeated for obtaining the elements of the coefficient vector $C_{TD2}$, may be repeated for obtaining elements of further coefficient vectors of further channel transfer functions of the first transmission channel TC1 and may be repeated for obtaining elements of further coefficient vectors of further channel transfer functions of the further transmission channels TC2 and TC3.

In a further step S8-M2, the first channel transfer function CTF1 may be reconstructed based on an equation, which may be obtained from equation (8) as described in T. Wild "A rake-finger based efficient channel state information feedback compression scheme", Vehicular Technology Conference (VTC 2010-Spring), 2010 IEEE 71$^{st}$, 16-19 May 2010 by reconverting the equation (8) into a form, which contains only the channel transfer function term $h^{CTF}$ on one side of the equation. The reconversion may be done for example by left-multiplying the coefficient vector $C_{TD1}$ by the hermitian (thus conjugate transpose) Moore-Penrose pseudoinverse of the DFT matrix D. The step S8-M2 may be preferably repeated for the second channel transfer function CTF2 and the further channel transfer functions of the first transmission channel TC1 and for the further channel transfer functions of the further transmission channels TC2 and TC3.

In a next step S9-M2, the reconstructed channel transfer functions CTF1, CTF2 etc. are used for an evaluation of the short term conditions of the transmission channels TC1, TC2 and TC3 by modifying for example adaptive complex transmit pre-coding antenna weights. When the short term conditions may have been changed above a predefined level, parameters of downlink CoMP transmission such as transmit pre-coding, modulation and coding scheme, multiple-access scheduling decisions or resource allocation decisions may be adapted and/or the reporting cluster may be updated (e.g. by adding a further antenna system of the radio communication system RCS or by removing an antenna system from the reporting cluster).

Next step after the step S9-M2 may be again the step S1-M2.

Figure 6:
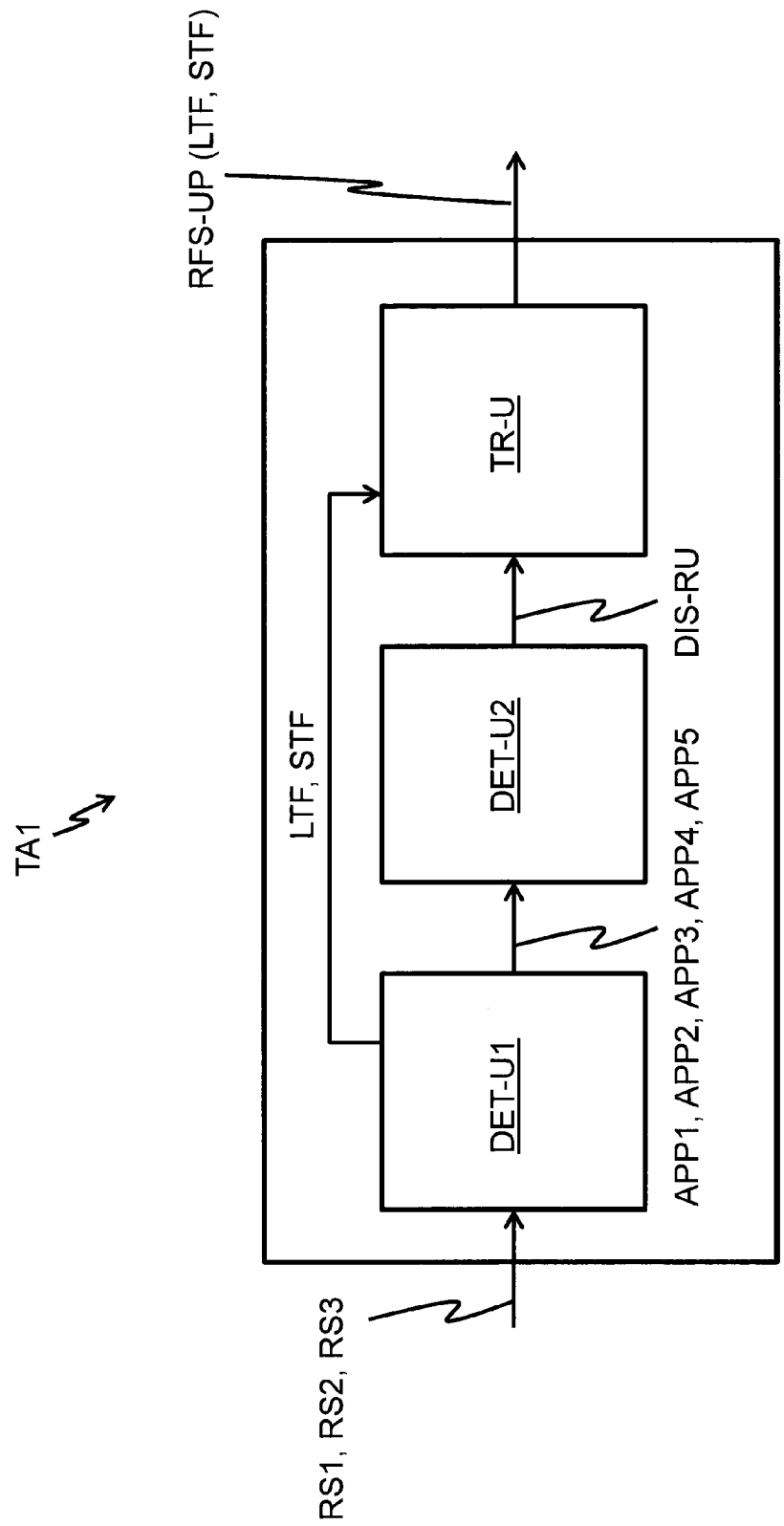
FIG. 6 shows schematically a block diagram of a transmission apparatus according to an embodiment of the invention.

FIG. 6 shows an exemplarily transmitter apparatus TA1 which contains a first determination unit or first determination module DET-U1, a second determination unit or determination module DET-U2 and a transmitter unit TR-U. The first determination unit or first determination unit module DET-U1 may obtain the received first reference signals RS1 of the first transmission channel TC1, received second reference signals RS2 of the second transmission channel TC2 and received third reference signals RS3 of the third transmission channel TC3 as input parameter, may calculate the first quality values APP1, APP2, APP3, APP4 and APP5 and the at least second quality values, may determine the short term feedback and the long term feedback and may provide the first quality values APP1, APP2, APP3, APP4 and APP5, the at least second quality values, the short term feedback STF and the long term feedback LTF as output parameters.

The second determination unit or second determination module DET-U2 may obtain the first quality values APP1, APP2, APP3, APP4 and APP5 and the at least second quality values as input parameters, may calculate the distribution of radio resource units DIS-RU of the predefined radio resource of the short term feedback and may provide the distribution of radio resource units DIS-RU as an output parameter.

Alternatively, all functions of the first determination unit or the first determination module DET-U1 and the second determination unit or the second determination module DET-U2 may be implemented in a single determination unit or single determination module.

The transmitter unit TR-U may be for example a transmitter or a transceiver, may obtain the distribution of radio resource units DIS-RU, the long term feedback LTF and the short term feedback STF as input parameters, may generate uplink radio frequency signals RFS-UP containing the long term feedback LTF and/or the short term feedback STF, and may provide the uplink radio frequency signals RFS-UP containing the long term feedback LTF and/or the short term feedback STF as output parameters.

Figure 7:
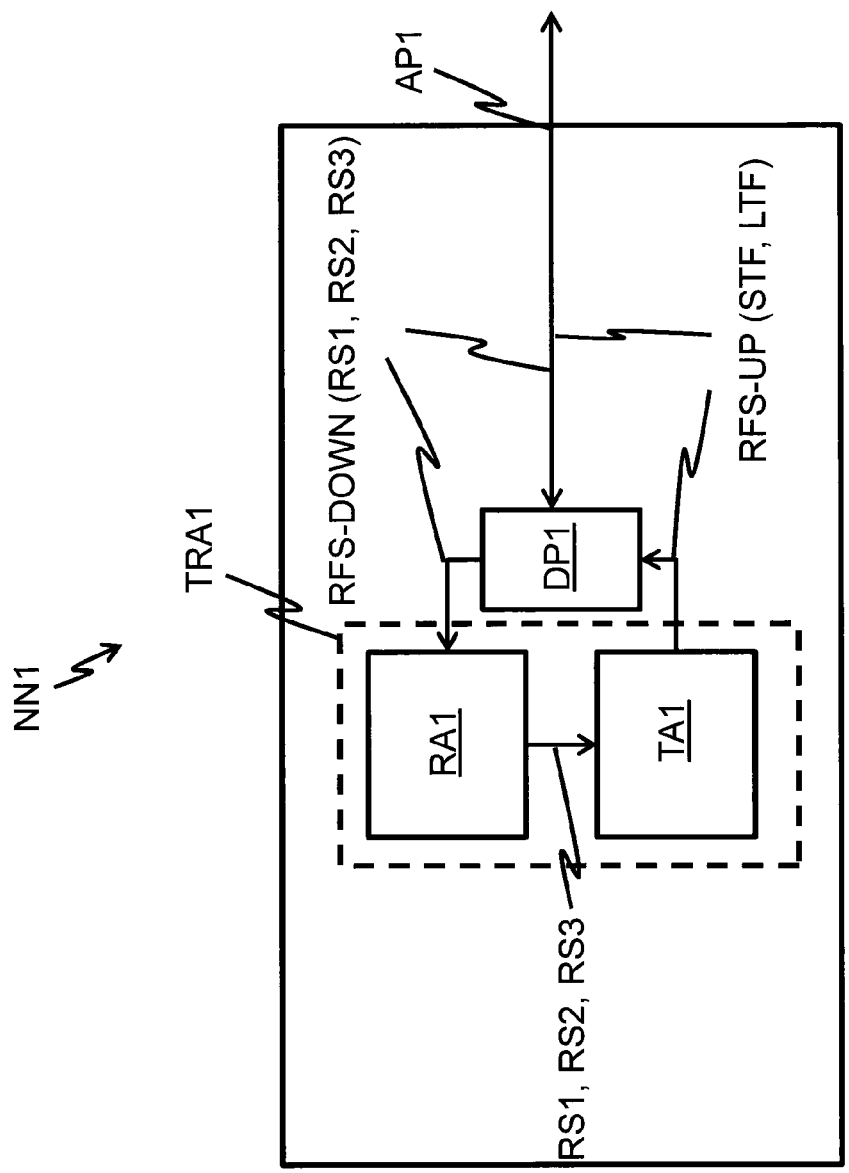
FIG. 7 shows schematically a block diagram of a first network node, which contains the transmitter apparatus.

FIG. 7 shows exemplarily a first network node NN1 for use in a radio communication system. The first network node NN1 may be for example the mobile station MS. The first network node NN1 may contain a transceiver TRA1 and a duplexer DP1. The transceiver TRA1 may contain the transmitter apparatus TA1 and a receiver apparatus RA1.

The duplexer DP1 may receive via an antenna port AP1 downlink radio frequency signals RFS-DOWN, which contain the first reference signals RS1, the second reference signals RS2 and the third reference signals RS3, as input signals and may provide the input signals to the receiver apparatus RA1. The receiver apparatus RA1 may extract the first reference signals RS1, the second reference signals RS2 and the third reference signals RS3 from the received downlink radio frequency signals RFS-DOWN and may provide the first reference signals RS1, the second reference signals RS2 and the third reference signals RS3 to the transmitter apparatus TA1. The transmitter apparatus TA1 may provide the uplink radio frequency signals RFS-UP containing the long term feedback LTF and/or the short term feedback STF as output signals to the duplexer DP1. The duplexer DP1 provides the output signals to the antenna port AP1 of the first network node NN1.

Figure 8:
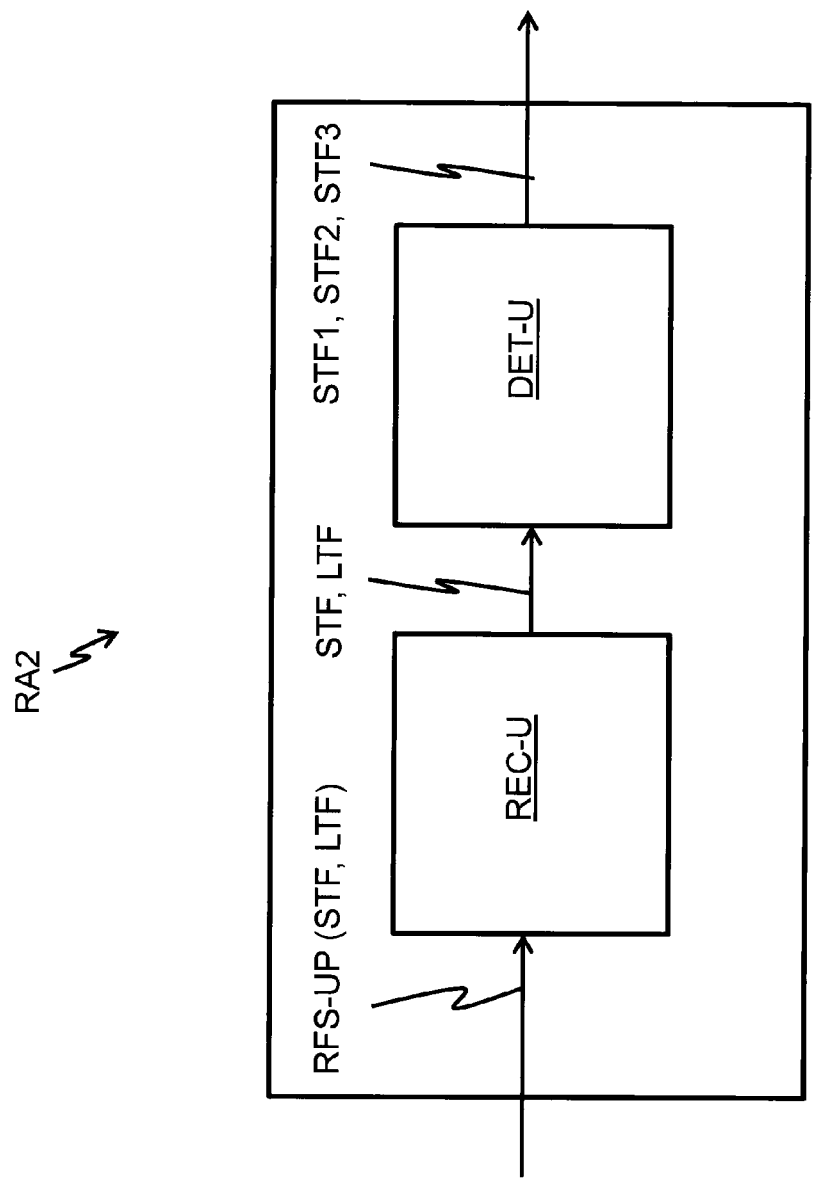
FIG. 8 shows schematically a block diagram of a receiver apparatus according to the embodiment of the invention.

FIG. 8 shows an exemplarily receiver apparatus RA2 which contains a receiver unit REC-U and a determination unit or determination module DET-U. The receiver unit REC-U may be for example a receiver or a transceiver and may obtain the uplink radio frequency signals RFS-UP, which contain the short term feedback and/or the long term feedback, as input parameters. The receiver unit REC-U extracts and recovers the short term feedback and the long term feedback from the uplink radio frequency signals RFS-UP and provides the short term feedback STF and the long term feedback LTF as output parameters.

The determination unit or determination module DET-U may obtain the short term feedback feedback STF and the long term feedback LTF as input parameter, may calculate the first short term information STF1 of the first transmission channel TC1 and the at least second short term information STF2, STF3 of the at least second transmission channel TC2, TC3 and may provide the first short term information STF1 and the at least second short term information STF2, STF3 as output parameters.

Figure 9:
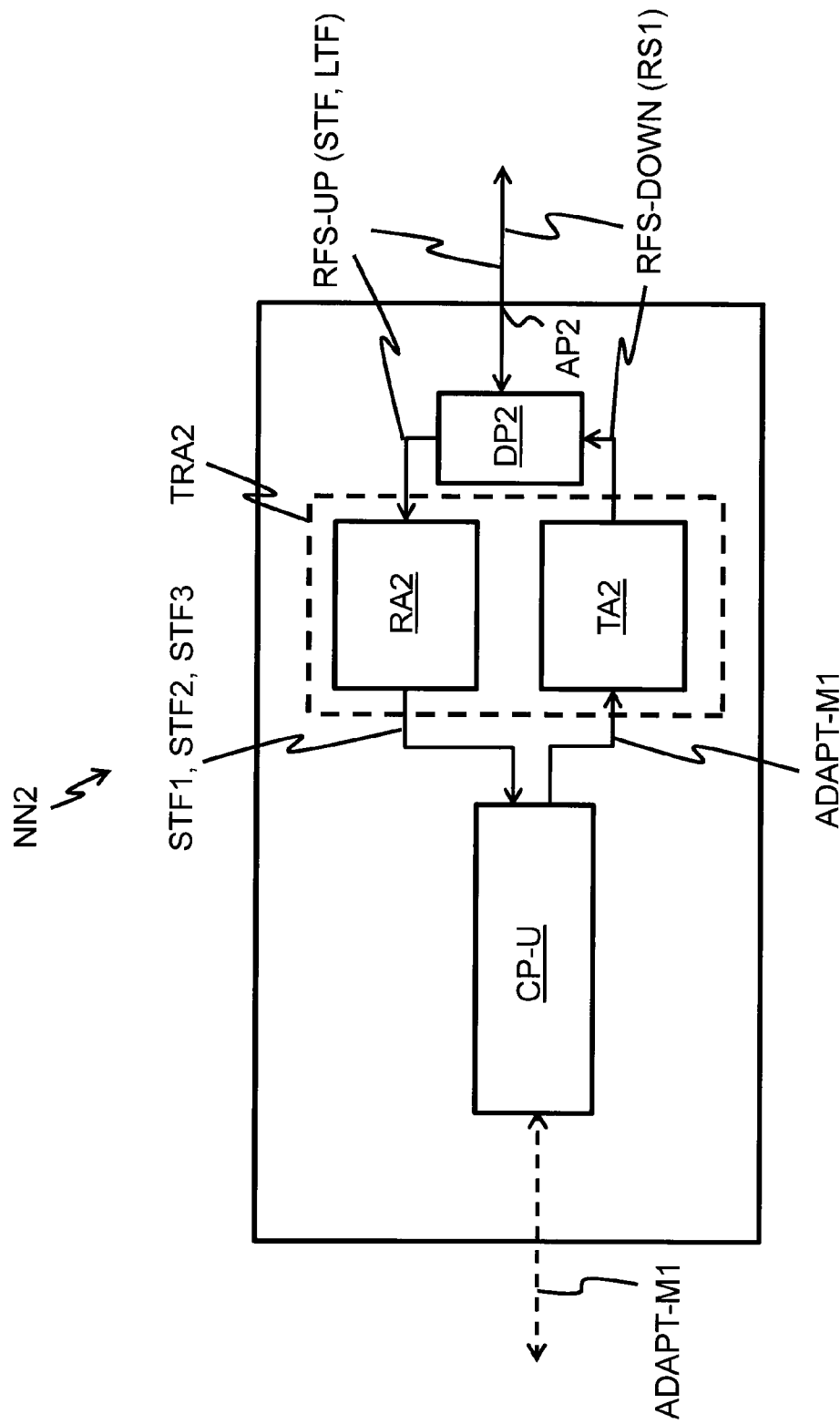
FIG. 9 shows schematically a block diagram of a second network node, which contains the receiver apparatus.

FIG. 9 shows exemplarily a second network node NN2 for use in a radio communication system. The second network node NN2 may be for example a master base station such as the first base station BS1. The second network node NN2 may contain a transceiver TRA2, a duplexer DP2 and central processing unit CP-U. The transceiver TRA2 may contain a transmitter apparatus TA2 and the receiver apparatus RA2.

The duplexer DP1 may receive via an antenna port AP2 the uplink radio frequency signals RFS-UP, which contain the short term feedback STF and the long term feedback LTF, as input signals and may provide the input signals to the receiver apparatus RA2. The receiver apparatus RA2 may extract the short term feedback STF and the long term feedback LTF from the received uplink radio frequency signals RFS-UP and may provide the short term feedback STF and the long term feedback LTF to the central processing unit CP-U. The central processing unit CP-U may evaluate the short term conditions of the transmission channels TC1, TC2 and TC3 and may adapt transmission parameters of the transmission channels TC1, TC2 and TC3 and/or may update the reporting cluster (e.g. by adding a further antenna system of the radio communication system RCS or by removing an antenna system from the reporting cluster). Corresponding signalling messages ADAPT-M1 may be transmitted to further network nodes of the reporting cluster such as the second base station BS2 or the third base station BS3 and/or to the transmitter apparatus TA2.

The transmitter apparatus TA2 may adapt the transmission parameters for the downlink CoMP transmission to the mobile station MS and provide the downlink radio frequency signals RFS-DOWN containing the first reference signals RS1 as output signals to the duplexer DP2. The duplexer DP2 provides the output signals to the antenna port AP2 of the second network node NN2.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for transmitting", "means for receiving", "means for determining" etc. (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods. Preferably, a computer program product may contain computer-executable instructions for performing the method MET1 or the method MET2, when the computer program product is executed on a programmable hardware device such as a DSP, an ASIC or an FPGA. Preferably, a digital data storage device may encode a machine-executable program of instructions to perform the method M1-TA or the method M2-RA.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A method for generating and transmitting channel feedback by a transmitter apparatus, said method comprising:
determining at least one first quality value averaged over a long term time interval for a first transmission channel from a first antenna system of a radio communication system to an antenna system of a network node comprising said transmitter apparatus and at least one second quality value averaged over said long term time interval for at least one second transmission channel from at least one second antenna system of said radio communication system to said antenna system of said network node,
determining jointly for said first transmission channel and for said at least one second transmission channel a distribution of radio resource units of a predefined feedback radio resource based on said at least first quality value and said at least second quality value,
transmitting to a receiver apparatus a long term feedback comprising said at least one first quality value and said at least one second quality value, and
transmitting with a short term time interval smaller than or equal to said long term time interval to said receiver apparatus a short term feedback comprising first short term information for said first transmission channel and at least second short term information for said at least second transmission channel using said distribution of radio resource units,
wherein said distribution of radio resource units is determined by a reverse water-filling algorithm and wherein said reverse water-filling algorithm comprises incrementally reducing a water filling level and allocating radio resource units to said at least first quality value and said at least second quality value depending on levels of said at least first quality value and said at least second quality value exceeding said water filling level.

2. Method according to claim 1, wherein said predefined feedback radio resource for said short term feedback is split into a first segment for a repeated transmission of said short term feedback for said first transmission channel and at least one second segment for a repeated transmission of said short term feedback of said at least one second transmission channel depending on said at least first quality value and said at least second quality value.

3. Method according to claim 1, wherein said first short term information relates to at least one first transmission path from one of at least one antenna element of said first antenna system to one of at least one antenna element of said antenna system of said network node and wherein said at least second short term information relates to at least one second transmission path from one of at least one antenna element of said at least one second antenna system to one of said at least one antenna element of said antenna system of said network node.

4. Method according to claim 1, wherein for an orthogonal frequency-division multiplexing transmission via said first transmission channel and said at least second transmission channel said first short term information comprises a first set of coefficients allowing to reconstruct a frequency-domain channel transfer function of said at least one first transmission path and said at least second short term information comprises at least one second set of coefficients allowing to reconstruct a frequency-domain channel transfer function of said at least one second transmission path or wherein for a code division multiple access transmission or a wideband code division multiple access transmission via said first transmission channel and said at least second transmission channel said first short term information comprises a first set of coefficients allowing to reconstruct a frequency-domain channel transfer function or a time-domain channel impulse response of said at least one first transmission path and said at least second short term information comprises at least one second set of coefficients allowing to reconstruct a frequency-domain channel transfer function or a time-domain channel impulse response of said at least one second transmission path.

5. Method according to claim 1, wherein said distribution of radio resource units (DIS-RU) comprises at least one radio resource unit for each transmission channel of a reporting cluster predefined by said receiver apparatus.

6. Method according to claim 1, wherein said long term feedback further comprises at least one first time delay value of said at least one first quality value and at least one second time delay value of said at least one second quality value, wherein said at least first quality value is a first power value and wherein said at least second quality value is a second power value.

7. Method according to claim 6, wherein said at least one first time delay value and said at least first power value are determined for at least one first local maximum of a first channel impulse response averaged over first channel impulse responses for first transmission paths of said first transmission channel between one of antenna elements of said first antenna system to one of antenna elements of said antenna system of said network node and wherein said at least second time delay value and said at least second power value are determined for at least one second local maximum of a second channel impulse response averaged over second channel impulse responses for transmission paths of said at least second transmission channel between one of antenna elements of said at least second antenna system to one of said antenna elements of said antenna system of said network node.

8. Method according to claim 7, wherein said determining for said distribution of radio resource units allocates radio resource units to said at least first local maximum and to said at least second local maximum.

9. Method according to claim 7, wherein said long term feedback is only transmitted for local maxima of said averaged first channel impulse response and of said averaged at least second channel impulse response with an allocated number of radio resource units larger than zero.

10. Method according to claim 1, wherein said transmitting for said long term feedback is repeated by said long term time interval or repeated, when said distribution of radio resource units has been changed.

11. Method for receiving and retrieving channel feedback at a receiver apparatus, said method comprising:
receiving from a transmitter apparatus a long term feedback comprising at least one first quality value averaged over a long term time interval for a first transmission channel from a first antenna system of a radio communication system to an antenna system of a network node comprising said transmitter apparatus and at least one second quality value averaged over said long term time interval for at least one second transmission channel from at least one second antenna system of said radio communication system to said antenna system of said network node,
receiving from said transmitter apparatus with a short term time interval smaller than or equal to said long term time interval a short term feedback comprising first short term information for said first transmission channel and at least second short term information for said at least second transmission channel using a distribution of radio resource units of a predefined feedback radio resource,
determining jointly for said first transmission channel and for said at least one second transmission channel said distribution of radio resource units based on said at least one first quality value and said at least one second quality value, and
determining said first short term information and said at least second short term information from said short term feedback based on said distribution of radio resource units,
wherein said distribution of radio resource units is determined by a reverse water-filling algorithm and wherein said reverse water-filling algorithm comprises
incrementally reducing a water filling level and allocating radio resource units to said at least first quality value and said at least second quality value depending on levels of said at least first quality value and said at least second quality value exceeding said water filling level.

12. A transmitter apparatus for generating and transmitting channel feedback, said transmitter apparatus comprising:
at least one processor configured to:
determine at least one first quality value averaged over a long term time interval for a first transmission channel from a first antenna system of a radio communication system to an antenna system of a network node comprising said transmitter apparatus and at least one second quality value averaged over said long term time interval for at least one second transmission channel from at least one second antenna system of said radio communication system to said antenna system of said network node,
determine jointly for said first transmission channel and for said at least one second transmission channel a distribution of radio resource units of a predefined feedback radio resource based on said at least first quality value and said at least second quality value, and
transmit to a receiver apparatus a long term feedback comprising said at least one first quality value and said at least one second quality value and for transmitting with a short term time interval smaller than or equal to said long term time interval to said receiver apparatus a short term feedback comprising first short term information for said first transmission channel and at least second short term information for said at least second transmission channel using said distribution of radio resource units
wherein said at least one processor is configured to determine said distribution of radio resource units by a reverse water-filling algorithm and wherein said reverse water-filling algorithm comprises
incrementally reducing a water filling level and allocating radio resource units to said at least first quality value and said at least second quality value depending on levels of said at least first quality value and said at least second quality value exceeding said water filling level.

13. A receiver apparatus for receiving and retrieving a channel feedback, said receiver apparatus comprising:
at least one processor configured to:
receive from a transmitter apparatus a long term feedback comprising at least one first quality value averaged over a long term time interval for a first transmission channel from a first antenna system of a radio communication system to an antenna system of a network node comprising said transmitter apparatus and at least one second quality value averaged over said long term time interval for at least one second transmission channel from at least one second antenna system of said radio communication system to said antenna system of said network node and for receiving from said transmitter apparatus with a short term time interval smaller than or equal to said long term time interval a short term feedback comprising first short term information for said first transmission channel and at least second short term information for said at least second transmission channel using a distribution of radio resource units of a predefined feedback radio resource,
determine jointly for said first transmission channel and for said at least one second transmission channel said distribution of radio resource units based on said at least one first quality value and said at least one second quality value, and
determine said first short term information and said at least second short term information from said short term feedback based on said distribution of radio resource units
wherein said at least one processor is configured to determine said distribution of radio resource units by a reverse water-filling algorithm and wherein said reverse water-filling algorithm comprises
incrementally reducing a water filling level and allocating radio resource units to said at least first quality value and said at least second quality value depending on levels of said at least first quality value and said at least second quality value exceeding said water filling level.

* * * * *